United States Patent
Heggelund et al.

(10) Patent No.: US 9,552,665 B2
(45) Date of Patent: Jan. 24, 2017

(54) HIDDEN SURFACE REMOVAL IN GRAPHICS PROCESSING SYSTEMS

(71) Applicant: ARM Limited, Cambridge (GB)

(72) Inventors: Frode Heggelund, Trondheim (NO); Joe Tapply, Cambridge (GB); Jean-Christophe Glas, Trondheim (NO); Andreas Engh Halstvedt, Trondheim (NO)

(73) Assignee: ARM LIMITED, Cambridge (GB)

( * ) Notice: Subject to any disclaimer, the term of this patent is extended or adjusted under 35 U.S.C. 154(b) by 490 days.

(21) Appl. No.: 13/845,561

(22) Filed: Mar. 18, 2013

(65) Prior Publication Data
US 2014/0267256 A1    Sep. 18, 2014

(51) Int. Cl.
*G06T 15/40* (2011.01)

(52) U.S. Cl.
CPC .................................... *G06T 15/40* (2013.01)

(58) Field of Classification Search
CPC .......... G06T 15/40; G06T 1/20; G06T 15/405; G06F 15/76
See application file for complete search history.

(56) References Cited

U.S. PATENT DOCUMENTS

| | | | | |
|---|---|---|---|---|
| 5,808,617 A * | 9/1998 | Kenworthy et al. | ........... | 345/421 |
| 6,697,063 B1 * | 2/2004 | Zhu | ...................... | G06T 15/005 345/421 |
| 6,750,869 B1 * | 6/2004 | Dawson | ................... | G06T 11/40 345/531 |
| 6,816,170 B1 * | 11/2004 | Udeshi | ......................... | 345/660 |
| 6,898,692 B1 * | 5/2005 | Cameron | .............. | G06T 15/405 710/52 |
| 7,505,036 B1 * | 3/2009 | Baldwin | ............... | G06T 15/503 345/419 |
| 8,154,547 B2 * | 4/2012 | Min | ...................... | G06T 15/405 345/421 |
| 8,233,004 B1 * | 7/2012 | Molnar et al. | ................. | 345/581 |
| 8,368,691 B2 * | 2/2013 | Howson | .................... | G06T 1/60 345/419 |
| 2005/0122338 A1 * | 6/2005 | Hong | .................... | G06T 15/405 345/546 |

(Continued)

OTHER PUBLICATIONS

VirtualRyan, Brute Force Sorting Algorithms, Binary Times, 2007, pp. 1-2.*

(Continued)

*Primary Examiner* — Jacinta M Crawford
*Assistant Examiner* — Phong Nguyen
(74) *Attorney, Agent, or Firm* — Vierra Magen Marcus LLP

(57) ABSTRACT

In a graphics processing pipeline 1, a primitive depth sorting stage 9 is arranged prior to the rasterization stage 3 and rendering stage 6. The primitive depth sorting stage 9 operates to sort successive sub-sets of primitives in a stream of primitives 2 received by the graphics processing pipeline 1 based on their depth values. The so-sorted primitives are then output from the primitive depth sorting stage 9 in their sorted depth order to the rasterizer 3. This makes the depth test stages 4, 13 of the graphics processing pipeline 1 more efficient in their hidden surface removal operations, because the primitives entering the rasterizer 3 will be in depth order.

23 Claims, 3 Drawing Sheets

(56) References Cited

U.S. PATENT DOCUMENTS

| | | | |
|---|---|---|---|
| 2005/0248569 A1* | 11/2005 | Fong | G06T 15/405 345/421 |
| 2008/0170066 A1* | 7/2008 | Falchetto | 345/419 |
| 2008/0273033 A1* | 11/2008 | Brennan | G06T 1/60 345/422 |
| 2009/0058851 A1* | 3/2009 | Piotrowski | G06T 15/40 345/419 |
| 2010/0007662 A1* | 1/2010 | Cox | G06T 15/40 345/420 |
| 2012/0159498 A1* | 6/2012 | Wilmarth | G06F 9/526 718/103 |
| 2013/0198480 A1* | 8/2013 | Jones | G06F 9/5016 711/170 |
| 2013/0241938 A1* | 9/2013 | Gruber | G06T 11/40 345/501 |
| 2014/0168220 A1* | 6/2014 | Nystad | G06T 1/20 345/421 |
| 2014/0195777 A1* | 7/2014 | Bellows | G06F 9/38 712/21 |

OTHER PUBLICATIONS

Priority Queues, http://www.dcs.gla.ac.uk/~pat/52233/slides/PriorityQueuesHeap1x1.pdf, University of Glasgow, 2001, pp. 1-43.*

Digital Differential Analyzer (graphics algorithm), Jan. 10, 2013, Available at: http://en.wikipedia.org/wiki/Digital_differential_Analyzer_(graphics_algorithm), 2 pages.

Early Fragment Test, [www.opengl.org/wiki/Early_Depth_Test], Jul. 27, 2013, 2 pages.

Greene, Hierarchical Polygon Tiling with Coverage Masks, 1996, 12 pages.

Hidden Surface Removal, Apr. 20, 2009, 24 pages.

Visual Surface Algorithms, Oct. 15, 2005, 30 pages.

Warnock, A Hidden Surface Algorithm for Computer Generated Halftone Pictures, Jun. 1969, 35 pages, National Technical Information Service, U.S. Department of Commerce.

Combined Search and Examination Report dated Sep. 19, 2014 in GB Patent Application No. 1404721.1, 5 pages.

* cited by examiner

HIDDEN SURFACE REMOVAL IN GRAPHICS PROCESSING SYSTEMS

BACKGROUND

The technology described herein relates to the processing of computer graphics, and in particular to hidden surface removal in graphics processing.

As is known in the art, graphics processing is normally carried out by first dividing the graphics processing (render) output, such as a frame to be displayed, into a number of similar basic components (so-called "primitives") to allow the graphics processing operations to be more easily carried out. These "primitives" are usually in the form of simple polygons, such as triangles.

The primitives for an output such as a frame to be displayed are usually generated by the applications program interface for the graphics processing system, using the graphics drawing instructions (requests) received from the application (e.g. game) that requires the graphics processing.

Each primitive is at this stage usually defined by and represented as a set of vertices. Each vertex for a primitive has associated with it a set of data (such as position, colour, texture and other attributes data) representing the vertex. This data is then used, e.g., when rasterising and rendering the vertex (the primitive(s) to which the vertex relates), e.g. for display.

Once primitives and their vertices have been generated and defined, they can be processed by the graphics processing system, in order, e.g., to display the frame.

This process basically involves determining which sampling points of an array of sampling points covering the output area to be processed are covered by a primitive, and then determining the appearance each sampling point should have (e.g. in terms of its colour, etc.) to represent the primitive at that sampling point. These processes are commonly referred to as rasterising and rendering, respectively.

The rasterising process determines the sampling points that should be used for a primitive (i.e. the (x, y) positions of the sample points to be used to represent the primitive in the render output, e.g. frame to be displayed). This is typically done using the positions of the vertices of a primitive.

The rendering process then derives the data, such as red, green and blue (RGB) colour values and an "Alpha" (transparency) value, necessary to represent the primitive at the sample points (i.e. "shades" each sample point). This can involve, as is known in the art, applying textures, blending sample point data values, etc.

(In 3D graphics literature, the term "rasterisation" is sometimes used to mean both primitive conversion to sample positions and rendering. However, herein "rasterisation" will be used to refer to converting primitive data to sampling point addresses only.)

These processes are typically carried out by testing sets of one, or of more than one, sampling point, and then generating for each set of sampling points found to include a sample point that is inside (covered by) the primitive in question (being tested), a discrete graphical entity usually referred to as a "fragment" on which the graphics processing operations (such as rendering) are carried out. Covered sampling points are thus, in effect, processed as fragments that will be used to render the primitive at the sampling points in question. The "fragments" are the graphical entities that pass through the rendering process (the rendering pipeline). Each fragment that is generated and processed may, e.g., represent a single sampling point or a set of plural sampling points, depending upon how the graphics processing system is configured.

(A "fragment" is therefore effectively (has associated with it) a set of primitive data as interpolated to a given output space sample point or points of a primitive. It may also include per-primitive and other state data that is required to shade the primitive at the sample point (fragment position) in question. Each graphics fragment may typically be the same size and location as a "pixel" of the output (e.g. output frame) (since as the pixels are the singularities in the final display, there may be a one-to-one mapping between the "fragments" the graphics processor operates on (renders) and the pixels of a display). However, it can be the case that there is not a one-to-one correspondence between a fragment and a display pixel, for example where particular forms of post-processing, such as downsampling, are carried out on the rendered image prior to displaying the final image.)

(It is also the case that as multiple fragments, e.g. from different overlapping primitives, at a given location may affect each other (e.g. due to transparency and/or blending), the final pixel output may depend upon plural or all fragments at that pixel location.)

(Correspondingly, there may be a one-to-one correspondence between the sampling points and the pixels of a display, but more typically there may not be a one-to-one correspondence between sampling points and display pixels, as downsampling may be carried out on the rendered sample values to generate the output pixel values for displaying the final image. Similarly, where multiple sampling point values, e.g. from different overlapping primitives, at a given location affect each other (e.g. due to transparency and/or blending), the final pixel output will also depend upon plural overlapping sample values at that pixel location.)

In one known technique for graphics processing, which is commonly referred to as "immediate mode" graphics processing or rendering, primitives are processed (rasterised and rendered) as they are generated, one after another.

In this type of system, the primitives (their vertices) are passed to the graphics system on a first-come, first-served basis, and primitives are thus rendered in the order that they are received.

It is also known in graphics processing systems to use so-called "tile-based" or "deferred" rendering. In tile-based rendering, rather than the entire render output, e.g., frame, effectively being processed in one go as in immediate mode rendering, the render output, e.g., frame to be displayed, is divided into a plurality of smaller sub-regions, usually referred to as "tiles". Each tile (sub-region) is rendered separately (typically one-after-another), and the rendered tiles (sub-regions) are then recombined to provide the complete render output, e.g., frame for display. In such arrangements, the render output is typically divided into regularly-sized and shaped sub-regions (tiles) (which are usually, e.g., squares or rectangles), but this is not essential.

In both immediate mode and tile-based rendering, the input to the rasterisation and rendering processes will typically include a list of graphics commands to be executed by the graphics processor. This "command list" will include, as is known in the art, commands instructing the graphics processor to draw primitives, and commands instructing other graphics processes, such as rendering state changes, start and end tile commands (in a tile-based system), etc.

In immediate mode rendering this command list will simply list the commands to be executed one-after-another, whereas in tile-based rendering the list may be, and typically will be, divided into "tiles" (i.e. will list the commands for each tile separately to the commands for the other tiles).

One drawback of current graphics processing systems is that because primitives are processed sequentially, and typically not in perfect front-to-back order, a given sampling point (and hence fragment and pixel) may be shaded multiple-times as an output is processed, e.g. for display. This occurs when a first received and rendered primitive is subsequently covered by a later primitive, such that the rendered first primitive is not in fact seen at the pixel(s) (and sampling point(s)) in question. Primitives can be overwritten many times in this manner and this typically leads to multiple, ultimately redundant, rendering operations being carried out for each render output, e.g. frame, being rendered. This phenomenon is commonly referred to as "overdraw".

The consequences of performing such ultimately redundant operations include reduced frame rates and increased memory bandwidth requirements (e.g. as a consequence of fetching data for primitives that will be overwritten by later primitives). Both of these things are undesirable and reduce the overall performance of a graphics processing system. These problems will tend to be exacerbated as render outputs, such as frames to be rendered, become larger and more complex (as there will be more surfaces in the potentially-visible view), and as the use of programmable fragment shading increases (as the cost of shading a given fragment using programmable fragment shading is relatively greater).

The problem of "overdraw" could be significantly reduced by sending primitives for rendering in front-to-back order. However, other graphics processing requirements, such as the need for coherent access to resources such as textures, and the need to minimise the number of API calls per frame, generally mandate other preferred ordering requirements for primitives. Also, a full front-to-back sort of primitives prior to rendering may not be practical while still maintaining a sufficient throughput of primitives to the graphics processing unit. These and other factors mean that front-to-back ordering of primitives for a given render output, e.g., frame, is generally not possible or desirable in practice.

A number of other techniques have therefore been proposed to try to reduce the amount of "overdraw" (the amount of redundant processing of hidden surfaces) that is performed when processing a render output, such as a frame for display (i.e. to avoid rendering non-visible primitives and/or fragments, etc.).

For example, it is known to carry out forms of hidden surface removal before a primitive and/or fragment is sent for rendering, to see if the primitive or fragment etc. will be obscured by a primitive that has already been rendered (in which case the new fragment and/or primitive need not be rendered). Such hidden surface removal may comprise, for example, early occlusion culling, such as early-Z (depth) and/or stencil, testing processes, as is known in the art.

These arrangements try to identify, e.g., fragments that will be occluded by already processed primitives (and therefore that do not need processing) before the later fragments are issued to the rendering pipeline. In these arrangements, the depth value, e.g., of a new fragment to be processed is compared to the current depth value for that fragment position in the depth buffer to see if the new fragment is occluded or not. This can help to avoid sending fragments that are occluded by already processed primitives through the rendering pipeline.

It has also been proposed to use a per-sample or per-fragment sorting pass before sending any fragments to the rendering pipeline so as to identify the front-most fragment for each fragment position before the fragments are issued to the rendering pipeline. This can effectively remove all hidden surfaces, regardless of the order the primitives are received in (as it identifies the fragment that needs to be processed for each fragment position before the fragments are sent for rendering).

However, this arrangement has a fixed cost irrespective of the order that the primitives are received in (i.e. irrespective of the rendering order specified by the application), and has to apply a large number of special cases to handle things like transparency, etc., where the application specified rendering order must be preserved. The cost for this sorting also increases with the number of samples being considered (as it essentially has to sort per sample), thereby making rendering using a high number of samples, such as multi-sampled anti-aliasing, very expensive when using this technique.

It is also known for application (e.g. game) developers to configure the application such that each render output, e.g., frame, is, in effect, rendered twice, first of all to draw all the opaque geometry with all rendering states other than the Z-test and Z-write disabled, and then a second time with full render states enabled.

This has the effect that the first rendering pass effectively fills the Z-buffer with the Z (depth) value of the closest opaque primitive for each fragment (sample) position. In the second, full rendering pass, as the Z-buffer is now filled with the Z-value of the closest opaque primitive, any early-Z test on the second pass can more effectively reject occluded fragments, and in particular will take account of all the primitives rendered in the first, "Z-only" rendering pass, not just of primitives that have been rendered ahead of the fragment in question.

This technique therefore can provide a more efficient early-Z test process, but it has the disadvantage that a given render output must be generated by the application and processed by the graphics processing system twice, once for the Z-only pass, and then again for the "full" rendering pass. While this may not be too problematic for higher powered, e.g. desktop, graphics systems, other, lower powered graphics systems, such as for portable and mobile devices, may, e.g., have bandwidth constraints that make generating and rendering each entire potentially-visible render output twice undesirable.

The Applicants believe therefore that there remains scope for improved techniques for hidden surface removal in graphics processing systems.

BRIEF DESCRIPTION OF THE DRAWINGS

A number of embodiments of the technology described herein will now be described by way of example only and with reference to the accompanying drawings, in which.

DETAILED DESCRIPTION

Figure 1:
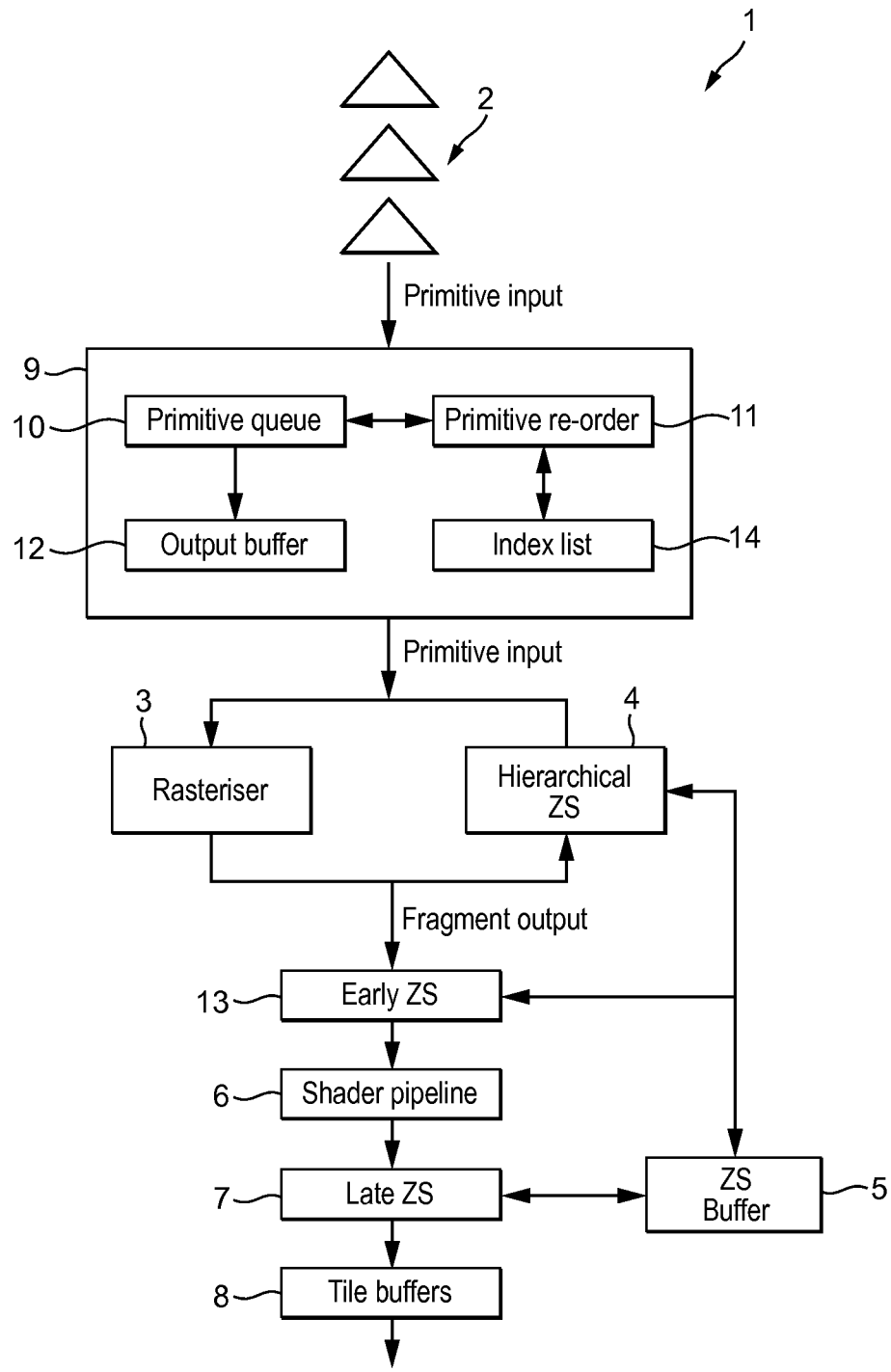
FIG. 1 shows schematically an embodiment of a graphics processing system that is in accordance with the technology described herein.

A first embodiment of the technology described herein comprises a method of operating a graphics processing pipeline that includes a plurality of processing stages including a rasteriser that rasterises input primitives to generate graphics fragments to be processed, each graphics fragment having one or more sampling points associated with it, and a renderer that processes fragments generated by the rasteriser to generate output fragment data, the method comprising:

when the graphics processing pipeline is processing a set of graphics primitives, depth sorting successive sub-sets of the primitives in the set of graphics primitives prior to the rasteriser generating graphics fragments for processing the primitives.

A second embodiment of the technology described herein comprises a graphics processing pipeline comprising:

a plurality of processing stages including a rasteriser that rasterises input primitives to generate graphics fragments to be processed, each graphics fragment having one or more sampling points associated with it, and a renderer that processes fragments generated by the rasteriser to generate output fragment data; and further comprising:

a primitive depth sorter configured to, when the graphics processing pipeline is processing a set of graphics primitives, depth sort successive sub-sets of the primitives in the set of graphics primitives prior to the rasteriser generating graphics fragments for processing the primitives.

The graphics processing pipeline of the technology described herein operates to depth-sort sub-sets of primitives to be processed by the graphics processing pipeline prior to rasterising the primitives to fragments for rendering. This has the advantage that the sorted primitives will be in depth order when they are rasterised to fragments, and so should make other hidden surface removal processes, such as early depth-testing and culling, more efficient. Indeed, the Applicants have found that the technology described herein can make such hidden surface removal arrangements significantly more efficient.

The technology described herein does its depth-sorting over sub-sets of the primitives to be processed (e.g. for a given render output, such as a frame for display). This has the advantage that by restricting the sorting to be over only sub-sets of the primitives, the cost for the sorting can be constrained, and, e.g., fixed to be a constant, known overhead (in contrast, e.g., to a "full" primitive sort which could have a significantly higher overhead (cost) and an unknown cost (since the number of primitives in the set for a given render output will typically not be known in advance)).

Moreover, the Applicants have found that more limited depth-sorting over only sub-sets of primitives to be processed for a render output can still significantly improve the hidden surface removal performance in the graphics processing pipeline. For example, the Applicants have found that for typical graphics content, a relatively high proportion of overdrawn primitives and fragments are overdrawn by primitives that are relatively close to each other in the primitive stream (close to each other in terms of primitive distance). The Applicants have found that for much "real world" graphics content, at least for small tile sizes (16×16 sampling points or fewer), around 50% of overdrawn fragments are overdrawn by one of the next four or five primitives in the primitive stream.

The set of primitives to be processed (and from which the sub-sets of primitives are taken) can comprise any suitable and desired set (stream) of primitives that is to be provided to (received by) (and processed by) the graphics processing pipeline. In an embodiment the set of primitives is some or all, and in an embodiment all, of the primitives that are to be processed to generate a given render output, such as a frame for display. In another embodiment, the set of primitives is some or all, and in an embodiment all, of the primitives that are to be processed to generate a given output tile of a render target to be generated in a tile-based graphics processing system.

The sub-sets of primitives that are sorted, at least during the "steady-state" of the sorting processing (i.e. outside of any ramping up and ramping down of the number of primitives at the start and end of the sorting process), in an embodiment contain a selected, limited, and in an embodiment predetermined, number of primitives. In an embodiment the sub-sets are between 2 to 16 primitives in size. In an embodiment the sub-sets are at least 5 primitives in size. In an embodiment the sub-sets do not exceed 16 primitives in size. In an embodiment each sub-set does not exceed 8 primitives in size. In an embodiment, each sub-set of primitives that is sorted during the "steady-state" of the sorting processing is the same size.

While each sub-set of primitives that is sorted could comprise a different set of primitives, in an embodiment, the sub-sets of primitives can, and in an embodiment do, overlap in terms of the primitives that they contain (i.e. a primitive or primitives that is in one sub-set that is sorted, can also be, and in an embodiment is also, included in another sub-set or sub-sets of primitives that are sorted). In an embodiment the successive sub-sets that are depth-sorted are generated on a rolling basis, such that once a sub-set is sorted, the first primitive in the sorted sub-set is passed onwards for processing, and the next primitive in the stream is added to the remaining primitives in the previous sub-set to generate a new sub-set for sorting, and so on.

The sub-sets of primitives can be depth sorted in any desired and suitable manner so as to sort the primitives based on depth values associated with the primitives in the sub-set. In an embodiment, a given depth value or values, such as a minimum and/or maximum depth value, associated with each primitive is used to do the sorting. In an embodiment a depth value range (in an embodiment a minimum/maximum depth value range) associated with a (and each) primitive is used to do the sorting. The sorting in an embodiment orders the primitives based on their associated depth values, and in an embodiment based on their associated depth value ranges, in an embodiment in front-to-back order. Where the sorting is done using depth value ranges, then in an embodiment, the primitives are not re-ordered (sorted) where overlapping depth ranges (or depth values) are found. The sorting may also take account of, and, e.g., be varied (differ) based on, the depth function being used, if desired. Other arrangements would be possible.

The sorting process can be performed in any suitable and desired manner, e.g. using any desired and suitable sorting algorithm, such as a full sort (search), a linear sort (search) or a logarithmic (binary) sort (search).

In one embodiment, the sorting is done as an iterative process, by testing a primitive against each other primitive in the set one-by-one, in a linear order (i.e. by searching through the list of primitives one-by-one in linear order (by using a linear search to find the (depth) position of the primitive in the sub-sets)). Thus, in an embodiment, a (new) primitive (the primitive's associated depth value range) is tested against (the depth value range of) the first primitive in the sub-set (the first primitive in the depth order in the sub-set) in a first cycle, and is then tested against the next primitive in the sub-set on the next cycle, and so on, until the position for the primitive in the sub-set depth order has been found (determined).

In another embodiment a logarithmic (binary) sorting process is used (i.e. a logarithmic (binary) search is used to find the (depth) position of the primitive in the sub-sets). In this case the sorting will again be done as an iterative process, by testing a primitive (the primitive's associated depth value range) against (e.g. a depth value range of) the mid-point primitive in the sub-set (in the depth order of the sub-set), and then testing the primitive against the mid-point primitive of the portion of the sub-set that the primitive being tested falls into, and so on, so as to iterate towards (hunt towards) the position for the primitive in the sub-set depth order.

In another embodiment, a full search process that can identify (find) the (depth) position of the primitive in the sub-set in a single processing cycle is used to depth sort the primitives.

Other searching (sorting) arrangements would, of course, be possible.

The sorting process could operate to re-order the primitives themselves (i.e. to "move" the primitives within the primitive set itself). However, in an embodiment, each primitive in the sub-set is associated with a respective index value, and the index values are re-ordered so as to sort the primitives (with the primitives then being processed in the order indicated by the re-ordered indexes). As only a limited sub-set of primitives is being sorted, the use of a separate index list for this purpose will not be too costly (and will be cheaper and easier to implement than having to "move" the primitives themselves in the primitive stream). Thus, in an embodiment, a separate list of indices for the primitives in the sub-set of primitives being sorted is maintained, and the indices in that separate list are re-ordered so as to sort (re-order) the primitives in the sub-set of primitives that is being sorted. The primitives are (in an embodiment) then issued (passed on to) the rest of the pipeline (e.g. to the rasteriser) in the order indicated by the (re-ordered) primitive indices (as against simply in their order in the primitive stream).

Thus, in an embodiment, each primitive in the sub-set is associated with a respective index value, and the index values are updated (changed) so as to sort the primitives (with the primitives then being processed in the order indicated by the updated indexes). Thus, in an embodiment, a separate list of indices for the primitives in the sub-set of primitives being sorted is maintained, and the indices in that separate list are updated (altered) as the primitives in the sub-set of primitives that is being sorted are sorted. The primitives are (in an embodiment) then issued (passed on to) the rest of the pipeline (e.g. to the rasteriser) in the order indicated by the (updated) primitive indices (as against simply in their order in the primitive stream).

Other arrangements that re-order or change primitive indices, and for otherwise sorting the primitives, could be used, if desired.

The sorting process can be implemented in any desired and suitable manner. In an embodiment, a queue is used to retain the sub-set of primitives while they are being sorted. This may be a queue that is otherwise already present in the graphics processing pipeline (e.g. in the rasteriser), or may be a queue that is added to the pipeline for the sorting process. In this case, in an embodiment primitives in the primitive set (stream) enter the queue, remain in the queue while the sub-set of primitives is depth-sorted, and then are allowed to pass out of the queue (in the sorted order) once the sorting has been completed.

Thus, in an embodiment, the primitive sub-set depth-sorting process of the technology described herein is carried out by (and the primitive depth sorter of the graphics processing pipeline is configured to depth-sort the sub-sets of primitives by) when the graphics processing pipeline receives a graphics primitive for processing, adding the primitive to a primitive queue, determining the order in which the primitive should exit the queue based on depth values (e.g., and in an embodiment, depth value ranges) associated with the primitives in the queue, and outputting primitives from the queue to the rest of the pipeline in an exit order determined based on the depth values (e.g., and in an embodiment, depth value ranges) associated with the primitives in the queue.

Thus, another embodiment of the technology described herein comprises a method of operating a graphics processing pipeline that includes a plurality of processing stages including a rasteriser that rasterises input primitives to generate graphics fragments to be processed, each graphics fragment having one or more sampling points associated with it, and a renderer that processes fragments generated by the rasteriser to generate output fragment data, the method comprising:

when the graphics processing pipeline receives a graphics primitive for processing, adding the primitive to a primitive queue, determining the order in which the primitive should exit the queue based on depth values associated with the primitives in the queue, and outputting primitives from the queue to the rest of the pipeline in the exit order determined based on the depth values associated with the primitives in the queue.

Another embodiment of the technology described herein comprises a graphics processing pipeline comprising:

a plurality of processing stages including a rasteriser that rasterises input primitives to generate graphics fragments to be processed, each graphics fragment having one or more sampling points associated with it, and a renderer that processes fragments generated by the rasteriser to generate output fragment data; and further comprising:

a primitive depth sorter configured to, when the graphics processing pipeline receives a graphics primitive for processing, add the primitive to a primitive queue, determine the order in which the primitive should exit the queue based on depth values associated with the primitives in the queue, and output primitives from the queue to the rest of the pipeline in the exit order determined based on the depth values associated with the primitives in the queue.

As will be appreciated by those skilled in the art, these embodiments of the technology described herein can, and in an embodiment do, include any one or more, or all, of the features of the technology described herein described herein. Thus, for example, the depth values associated with the primitives in the queue are in an embodiment depth value ranges associated with the primitives in the queue.

Similarly, the primitive queue in an embodiment holds a fixed (and in an embodiment limited) number of primitives. Thus, the queue is in an embodiment sized so as to hold the desired sub-sets of primitives that are to be sorted, so it may, e.g., be 8 primitives long. The queue can in an embodiment contain a selected, limited, and in an embodiment predetermined, number of primitives. In an embodiment the queue is between 2 to 16 primitives in size. In an embodiment the queue is at least 5 primitives in size. In an embodiment the queue does not exceed 16 primitives in size. In an embodiment the queue can contain (at most) 8 primitives.

The primitives may be allowed to exit queue before the queue is full (e.g. at the start of the sorting of the set of primitives in question), or the arrangement could be that the queue has to be full before the first primitive is allowed to exit the queue (and in an embodiment, this is done). If the queue doesn't have to be full, the output order may be in deterministic, whereas if the queue must be full, a given set of primitives will always be sorted in the same order, regardless of timing differences.

If the process waits until the queue is full, there may be an initial delay in outputting the primitives from the queue (sorting process) while the queue fills up (although the throughput will be the same). For normal rendering jobs this initial delay should be insignificant.

It may also be the case that as the end of the set of primitives is reached, the queue will not be filled as the final few primitives exit the queue.

In an embodiment, primitives are allowed to exit the queue (the queue is emptied) even if the queue is not yet full when a primitive for the next tile arrives, and/or a primitive that cannot be re-ordered (this will be discussed further below) enters (is input to) the queue (the reason for this is that if an input primitive cannot be reordered (sorted), there is less latency if it is sent out from the queue earlier). (The queue does not need to be made empty before the new primitives enter, the intention is just to allow the old primitives to exit before the queue is full.) Otherwise, in an embodiment the queue is filled before any sorting takes place, as this can improve the sorting quality.

As discussed above, in an embodiment, the queue has an associated list of primitive indices which are re-ordered and/or updated (changed) by the sorting process so as to sort the primitives in the queue. In an embodiment the primitives are output from the sorting queue in the order indicated by the associated primitive sorting order indices. In an embodiment, the primitives are output from the sorting queue to an output buffer (from where they are then output to the rest of the pipeline, such as the rasteriser).

In an embodiment, the graphics processing pipeline is configured such that any delay required to complete the sorting process does not require later stages of the pipeline, such as the renderer, to stall until the sorting is completed (save possibly for an initial delay while the queue fills up, as discussed above). This may be, and is in an embodiment, achieved by providing some gearing between the production of tasks for the later stages of the graphics processing pipeline and the sorting process. For example, and in an embodiment, the pipeline could be configured such that each sorted primitive generates plural tasks for the later stages of the processing pipeline, thereby keeping those later stages occupied even if it may take a number of processing cycles for each primitive to exit the sorting process.

While the operation in the manner of the technology described herein to sort sub-sets of primitives in the primitive set could be performed in respect of each and every primitive in the primitive set, the Applicants have recognised that for certain primitives in the primitive set, such as non-fully opaque primitives, it may not always be appropriate to change the order of those primitives in the primitive set (e.g. because the primitive's original processing order (position) in the set needs to be maintained to provide the desired rendering result).

Thus, in an embodiment the operation in the manner of the technology described herein to sort sub-sets of primitives in the primitive set is carried out in respect of selected primitives only, in an embodiment primitives that meet certain selected, in an embodiment predetermined, criteria. In other words, in an embodiment, primitives in the primitive set that meet certain selected, in an embodiment predetermined, criteria (that have particular, selected, in an embodiment predetermined, properties), are not re-ordered by the primitive sub-set sorting process (but are processed in their original order (position) in the primitive set). Similarly, in an embodiment, only primitives in the primitive set that meet certain selected, in an embodiment predetermined, criteria (that have particular, selected, in an embodiment predetermined, properties), can be and are re-ordered by the primitive sub-set sorting process.

The criteria for a primitive being able to be re-ordered, or not being able to be re-ordered, in the primitive stream by the primitive sub-set sorting process of the technology described herein can be any selected and suitable criteria.

In an embodiment, the criteria for a primitive not being re-ordered (and not being allowed to be re-ordered) in the primitive set include one or more of: the primitive does not have an associated depth value; the primitive is to write to the stencil buffer; the primitive has (e.g. shader) side effects; the primitive is to contribute to an occlusion query (an occlusion counter); and the primitive has a blending mode that requires the original primitive position (order) to be maintained. Other criteria would also or instead be possible.

Where a primitive that cannot be re-ordered is identified, then the sorting process is in an embodiment configured such that later primitives in the primitive set cannot then be re-ordered in front of the identified "cannot be re-ordered" primitive. This can be achieved as desired, but in an embodiment is achieved by (immediately) constraining all subsequent sub-sets of primitives in the primitive set over which depth-sorting is carried out to only contain primitives that come after (lie behind) the identified "cannot be reordered" primitive in the primitive set. In other words, the subsequent primitive sub-set sorting "windows" are constrained to be behind the primitive that cannot be re-ordered.

Where a queue is used to sort the primitives, then where a "cannot be re-ordered" primitive is identified, new primitives entering the queue are accordingly in an embodiment only sorted against (compared to) primitives in the queue that lie behind (in the input (original) primitive stream order) the identified "cannot-be-re-ordered" primitive.

In an embodiment, each primitive has associated with it a "can be reordered" indicator (information), such as a flag, that can be set to indicate whether the primitive can be re-ordered in the primitive set or not. This facilitates identifying and controlling whether primitives can be re-ordered or not. In an embodiment each primitive initially has the "can be re-ordered" indicator set to indicate that the primitive can be re-ordered, but the indicator is then cleared (set to indicate that the primitive should not be re-ordered) if it is determined that the primitive should not be re-ordered.

Thus, in an embodiment, the depth sorting process first checks information (e.g. a flag) associated with a primitive indicating whether the primitive can be re-ordered in the primitive set or not, before attempting to depth sort the primitive (and either proceeds with the depth-sorting for the primitive or not, depending upon what the information indicates).

Similarly, in an embodiment, when a primitive is to have its depth value(s) compared to the depth value(s) of another primitive in the sub-set, the depth sorting process first checks for one or both, and in an embodiment for both, primitives information (e.g. a flag) associated with the primitive indicating whether the primitive can be re-ordered in the primitive set or not, before attempting to depth sort the primitives (and either proceeds with the depth-sorting for the primitives or not, depending upon what the information indicates).

In an embodiment a primitive is allowed to have other primitives drawn before itself (i.e. it can be re-ordered) if it does not have alpha blending, or it had alpha blending and the depth range indicates the primitive is overdrawn, and it does not have side effects.

In an embodiment, a primitive is allowed to be drawn in front of other primitives (i.e. it can be re-ordered) if the depth range of the primitive is on the visible side of the depth test, and it does not write to stencil or the primitive drawn before it didn't have stencil test set.

Thus, in an embodiment, each primitive added to the primitive set has the "allow reorder" indicator initially set such that later primitives can be reordered in front of it, but if the primitive has side effects and "force early depth" set, the "allow reorder" indicator for the primitive is then cleared (to indicate that the primitive should not be re-ordered).

In an embodiment, if the depth test changes, the "allow reorder" indicator is then cleared for all earlier primitives.

The primitive sub-set sorting process can be implemented at any desired and suitable stage before the rasteriser generates the graphics fragments for processing the primitives. Thus it may, e.g., and in one embodiment is, implemented prior to the rasteriser (the rasterisation process). In one embodiment, it is implemented after the primitive (triangle) set-up stage of the graphics processing pipeline (between the primitive (triangle) set-up stage and the rasteriser of the graphics processing pipeline). In an embodiment it is implemented immediately prior to the rasteriser. This has the advantage that the sorting process may be relatively straightforward to implement efficiently in the graphics processing pipeline.

The primitive sub-set sorting process may also, e.g., be implemented as part of the rasterisation process (but before the fragments for processing the primitive are generated by the rasterisation process). This may be desirable where, e.g., the rasterisation process operates in a pipelined and/or iterative manner (as will be discussed further below). In this case, the primitive sub-set sorting process may, e.g., be performed as or after a first or initial stage (e.g. sub-division stage) of the rasterisation process, before further rasterisation (e.g. sub-division) stages, e.g. to generate fragments, are performed. In one embodiment, this is what is done.

In one embodiment, the primitive sub-set sorting process takes place after the primitives have been tiled (i.e. after the tile lists for the tiles to be rendered have been prepared). In this case, the and each set of primitives that is sorted accordingly in an embodiment comprises a set of primitives to be processed for a given tile. Thus the set of primitives being processed in an embodiment comprises the set of primitives to be processed for the tile in question, and the respective sub-sets of primitives that are sorted in an embodiment comprise sub-sets of primitives from the set of primitives to be processed for the tile.

In this case, where the primitive sub-set sorting is effectively being done on a per tile basis, the depth values that are used to sort the primitives are in an embodiment the depth values for the respective primitives within the tile in question, i.e. the sorting is based on the depth values for the primitives and for each primitive within the tile only, not the full primitive depth values. This has the advantage that it will sort the primitives based on their depth positions within the tile in question and so may result in better sorting than depth sorting per primitive across the render output as a whole (as primitives might require different sorting in different tiles).

Thus in an embodiment, the primitives are sorted based on the primitives' depth values within a given tile (rather than their depth values more generally).

In another embodiment, the primitive sub-set sorting is implemented earlier in the graphics processing pipeline (before primitive (triangle) set-up). This may allow the sorting to be used to increase the efficiency of further stages in the graphics processing pipeline. In an embodiment, where the graphics processing system is a tile-based graphics processing system, the depth sorting process is carried out as part of (during) the tiling process (as part of the tiler). In an embodiment it is carried out within the tiler (the tiling process), before the tile lists are written to memory.

In such an arrangement, if tiling process does not write the tile lists directly to memory, but instead collects writeback data for the most recently written tiles and writes them to memory in larger bursts, then the primitives are in an embodiment re-ordered within the writeback cache before it is written to memory.

If the re-ordering is done in the writeback cache, the following state is in an embodiment stored per primitive internally in the cache: a "Can be reordered" indicator (e.g. flag); and the min z/max z for the primitive.

The primitives may also be culled before the list is written to memory if desired (thereby saving bandwidth, triangle set-up, rasterizer and shader time). If full/partial coverage is calculated for the primitives, a primitive is in an embodiment allowed to be culled if: a new primitive covers the whole tiling level and has non-overlapping depth ranges, and the new primitive does not have stencil test, the new primitive does not have alpha test/alpha to coverage, the new primitive does not have blending, the depth test of the new primitive passes when compared to the old primitive, and the old primitive does not have side effects. In this case, to allow efficient culling, full/partial coverage is also in an embodiment calculated and/or stored as part of the primitive state.

Where the tiling process performs hierarchical tiling (i.e. can tile (list) primitives at different render target area resolutions (sub-divisions), then in an embodiment, if a primitive that cannot be re-ordered is added to one hierarchical tiling level, then in an embodiment all earlier primitives on the other hierarchical levels that has not yet been written to memory are in an embodiment also set to being primitives that cannot be re-ordered (e.g. the "allow reorder flag" is in an embodiment cleared for every earlier primitive on the other hierarchical levels that has not yet been written to memory). In an embodiment earlier primitives for the same hierarchical level are still allowed to be re-ordered (the flag for the same hierarchical level is in an embodiment not cleared).

In another embodiment the primitive reordering (sorting) is done before the tiling hierarchy level choice for listing the primitives is done. This may need additional sorting buffers, but it has the advantage that the primitive min/max depth ranges may be kept for a shorter time and the sorting itself may sway the tiling hierarchy level choice for the primitives (thereby improving the efficiency of the tiling process (for example when one primitive fully covers part of a primitive such that moving the covered primitive to another hierarchy level might be more efficient)). If the reordering is done earlier, it may also no longer necessary to prevent reordering for other hierarchy levels (thereby allowing for more reordering).

Where the graphics processing system uses the same index for both ordering primitives and as a basis for a PrimitiveID (primitive index) then in one embodiment, when PrimitiveID is in use, the primitive sorting (reordering) is disabled. This does mean that the primitive sorting (reordering) will only be done when PrimitiveID is not in use, but this should be acceptable because PrimitiveID is an uncommon feature.

In another embodiment, the PrimitiveID is encoded in a different way (not using the primitive ordering index), for example, and in an embodiment, as part of the primitive command. This should be acceptable because the compressed primitive format should be able to encode this relatively cheaply because the reordering only will reorder within a small window which will result in a small delta value between the PrimitiveID and the ordering index.

Encoding PrimitiveID as part of a compressed command could be done using the following methods: reserving a bit in the compressed format to encode if the delta between order index and Primitive ID is 0 or if the delta is encoded within the command, or having a new compressed format with primitiveID that allows the bit-width for the different encoded values to be dynamically changed in the encoding scheme.

As discussed above, an important advantage of the technology described herein is that it can make other hidden surface removal processes, such as early culling (e.g. depth) tests, more efficient. Thus, in an embodiment, the graphics processing pipeline of the technology described herein includes an early culling test, such as an early depth test, before the renderer stage of the graphics processing pipeline, so as to try to cull graphics entities, such as sampling points, fragments and/or primitives, before they are processed by the renderer.

Thus, in an embodiment, the method of the technology described herein further comprises performing an early culling test in respect of at least one sampling point associated with a fragment generated by the rasteriser before the fragment is sent to the renderer for processing. Similarly, the graphics processing pipeline in an embodiment comprises an early culling test stage that performs an early culling test in respect of sampling positions associated with fragments generated by the rasteriser before the fragments are sent to the renderer for processing.

The early culling test may comprise any suitable such testing, such as early occlusion testing, such as depth (Z) testing and/or early stencil testing. In an embodiment it comprises an early depth (Z) test (or tests). In an embodiment it comprises both early depth and early stencil tests.

In an embodiment, the pipeline includes an early culling test that operates on patches (sets) of plural fragments.

In an embodiment, the pipeline includes an early culling test that tests sets of plural fragments and/or individual fragments, followed by an early culling test that tests individual sampling points.

The early culling test or tests themselves can be carried out in any suitable and desired manner, e.g., in the normal manner known in the art and/or used in the graphics processing system in question. They are in an embodiment carried out in an appropriately conservative manner, as is known in the art. They may, e.g., test the (or each) sampling point specifically, or may be tests that have the effect of testing the sampling point(s), even if they do not test the (or each) sampling point specifically.

The early culling test or tests may be implemented, e.g., as part of the rasteriser, or after the rasteriser (but before the renderer), or as a combination of this (e.g. where there is more than one early culling test). In an embodiment it or they are implemented as part of the rasterisation process and/or after the rasteriser but before the rest of the graphics processing pipeline.

If the sampling point or points, or fragment or fragments, being tested fails the early culling test (e.g. is found to be occluded), then that sampling point or points, or fragment or fragments, is in an embodiment "culled" from further processing in the pipeline as is known in the art.

The rasteriser of the graphics processing pipeline can be configured to operate in any suitable and desired manner, for example as in known rasterising arrangements. It should, as is known in the art, operate to generate graphics fragments for processing in dependence upon which sampling points (or which sets of sampling points) of an array of sampling points covering the area of the output of the graphics processing pipeline a given primitive, etc., received by the rasteriser covers (at least in part). The rasteriser in an embodiment generates a graphics fragment for each sampling point covered by, and/or for each set of plural sampling points (e.g., sampling mask) found to include a sampling point that is covered by, the (and each) primitive being rasterised.

Each fragment generated by the rasteriser may represent (have associated with it) a single sampling point, or plural sampling points, as desired. In an embodiment, each fragment represents a set of plural, in an embodiment four (2×2), sampling points.

In an embodiment, the rasteriser is a hierarchical rasteriser that operates to iteratively test primitives against progressively smaller patches of sampling points down to a given, in an embodiment selected, in an embodiment predetermined, minimum patch size, discarding any patches that do not cover the primitive (at least in part), and to then generate a fragment or fragments for rendering corresponding to the patch or patches of sampling points found to be covered at least in part by the primitive. Each patch of sampling points that is tested in an embodiment corresponds to an integer number of fragments, such as 16×16, 8×8, 4×4 and/or 2×2 fragments.

In some embodiments, the graphics processing pipeline comprises, and/or is in communication with, one or more memories and/or memory devices that store the data described herein and/or store software for performing the processes described herein. The graphics processing pipeline may also be in communication with a host microprocessor, and/or with a display for displaying images based on the data generated by the graphics processor.

The renderer of the graphics processing pipeline should be operable to render (shade), graphics fragments it receives to generate the desired output graphics fragment data, as is known in the art. It may contain any suitable and desired rendering elements and may be configured in any suitable and desired manner. Thus, for example, it may comprise a fixed function rendering pipeline, including one or more fixed function rendering stages, such as texture mappers, blenders, fogging units, etc. In an embodiment the renderer comprises a fragment shader (a shader pipeline) (i.e. a programmable pipeline stage that is operable to and can be programmed to carry out fragment shading programs on fragments in order to render them). The technology described herein may be particularly advantageous where fragment shading is being used, as fragment shading can be a relatively costly process, and so more efficient early removal of hidden surfaces is particularly advantageous where fragment shading is being done.

As will be appreciated by those skilled in the art, the renderer will process the fragments it receives to then generate output rendered fragment data, which rendered fragment data is then in an embodiment written to an output buffer, such as a frame buffer, in external memory, for use (e.g. to display a frame on a display).

The technology described herein can be used irrespective of the form of output that the graphics processing system may be providing. Thus, for example, it may be used where the render output is intended to form an image (a frame) for display (e.g. on a screen or printer) (and in one embodiment this is the case). However, the technology described herein may also be used where the render output is not intended for display, for example where the render output is a texture that the graphics processing system is being used to generate (e.g. in "render to texture" operation), or, indeed, where the output the graphics processing system is being used to generate is any other form of data array.

The various functions of the technology described herein can be carried out in any desired and suitable manner. For example, the functions of the technology described herein can be implemented in hardware or software, as desired. Thus, for example, the various functional elements, processing stages, and "means" of the technology described herein may comprise a suitable processor or processors, controller or controllers, functional units, circuitry, processing logic, microprocessor arrangements, etc., that are operable to perform the various functions, etc., such as appropriately configured dedicated hardware elements or processing circuitry and/or programmable hardware elements or processing circuitry that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

The technology described herein is applicable to any suitable form or configuration of graphics processing system, graphics processor, and renderer having a "pipelined" arrangement. The graphics processing pipeline can contain any suitable and desired processing stages, etc., that graphics processing pipelines normally include. The technology described herein is particularly applicable to tile-based graphics processors and graphics processing systems, and to multi-core graphics processing systems. Thus, in an embodiment, the graphics processing system is a tile-based graphics processing system. Similarly, in an embodiment, the graphics processing system is a multi-core system (i.e. includes plural graphics processing cores).

The technology described herein accordingly extends to a graphics processor and a graphics processing platform including the apparatus of, or operated in accordance with the method of, any one or more of the embodiments of the technology described herein described herein. Subject to any hardware necessary to carry out the specific functions discussed above, such a graphics processor can otherwise include any one or more or all of the usual functional units, etc., that graphics processors include.

It will also be appreciated by those skilled in the art that all of the described embodiments of the technology described herein can include, as appropriate, any one or more or all of the features described herein.

The methods in accordance with the technology described herein may be implemented at least partially using software e.g. computer programs. It will thus be seen that when viewed from further embodiments the technology described herein provides computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processing system may be a microprocessor, a programmable FPGA (Field Programmable Gate Array), etc.

The technology described herein also extends to a computer software carrier comprising such software which when used to operate a graphics processor, renderer or microprocessor system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein provides computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible medium, such as a non-transitory computer readable medium, for example, diskette, CD ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink wrapped software, pre loaded with a computer system, for example, on a system ROM or fixed disk, or distributed from a server or electronic bulletin board over a network, for example, the Internet or World Wide Web.

A number of embodiments of the technology described herein will now be described.

FIG. 1 shows schematically a graphics processor 1 that may operate in accordance with the technology described herein.

FIG. 1 shows the main elements and pipeline stages of the graphics processor 1 that are relevant to the operation of the present embodiment. As will be appreciated by those skilled in the art there may be other elements of the graphics processor that are not illustrated in FIG. 1. It should also be noted here that FIG. 1 is only schematic, and that, for example, in practice the shown functional units and pipeline stages may share significant hardware circuits, even though they are shown schematically as separate stages in FIG. 1. It will also be appreciated that each of the stages, elements and units, etc., of the graphics processor as shown in FIG. 1 may be implemented as desired and will accordingly comprise, e.g., appropriate circuitry and/or processing logic, etc., for performing the necessary operation and functions.

The graphics processing system shown in FIG. 1 is a tile-based system. The graphics processor 1 will thus, as is known in the art, produce tiles of a render output data array, such as an output frame to be generated. (The technology described herein is equally applicable to other systems, such as immediate mode rendering systems, as discussed above.) The output data array may, as is known in the art, typically be an output frame intended for display on a display device, such as a screen or printer, but may also, for example, comprise a "render to texture" output of the graphics processor, etc.

FIG. 1 shows schematically the pipeline stages after the graphics primitives (polygons) 2 for input to the rasterisation process have been generated. Thus, at this point the graphics data (the vertex data) has undergone transformation and lighting operations (not shown), and a primitive set-up stage (not shown) has set-up the primitives to be rendered in response to the commands and vertex data provided to the graphics processor 1, as is known in the art.

As shown in FIG. 1, this part of the fragment processing pipeline of the graphics processor 1 includes a number of processing stages, including a primitive depth sorting stage (a primitive depth sorter) 9, a rasterisation stage 3, an early hierarchical ZS (depth and stencil) test stage 4, an early ZS (depth and stencil) stage 13, a rendering stage in the form of a fragment shading stage 6, and a late ZS (depth and stencil) test stage 7.

The rasterisation stage 3 operates, as is known in the art, to rasterise the primitives making up the render output (e.g. the image to be displayed) into individual graphics fragments for processing. To do this, the rasteriser 3 receives graphics primitives output by the primitive depth sorting stage 9 for rendering, rasterises the primitives to sampling points and generates graphics fragments having appropriate positions (representing appropriate sampling positions) for rendering the primitives. In the present embodiment, each graphic fragment that is generated by the rasteriser 3 represents (has associated with it) plural (and normally 4) sampling positions. (Other arrangements would, of course, be possible). Each graphics fragment has associated with it a coverage mask indicating which sampling points of the plural sampling positions that the fragment represents, it is actually being used to render (i.e. are actually covered by the primitive in question).

In the present embodiment, the rasteriser 3 is a hierarchical rasteriser that operates to iteratively test primitives against progressively smaller patches of sampling points (and thus, correspondingly, patches of fragments) down to a minimum patch size corresponding to a 2×2 group of fragments (i.e. to an array of sampling points that would be rasterised to a 2×2 group of fragments), discarding any patches that do not (at least in part) cover the primitive. Each patch that is tested corresponds to a given set of fragments.

This is done by the rasteriser 3 starting with a large patch of the render target area and testing if the primitive in question is inside that patch. If not, the entire patch is discarded, and the next patch tested, and so on. On the other hand, if a primitive is found to be within the patch (to cover, at least in part, the patch), the patch is sub-divided into 4 parts, and each "sub-patch" is then tested in the same way, and so on, until the minimum patch size is reached.

Once the minimum patch size has been reached (i.e. a patch of 2×2 fragments that covers, at least in part, the primitive has been identified), the rasteriser 3 then tests the individual sampling points in that final patch to see if the sampling points are covered by the primitive. The rasteriser 3 then generates and outputs individual fragments for rendering corresponding to the sampling points found to be covered by the primitive.

The rasteriser 3 also associates with each fragment a coverage mask in the form of a bitmap that indicates, for each sample position of the set of sample positions that is associated with the fragment, whether that sample position is covered (i.e., in effect, whether the fragment is being used to render that sampling point (i.e. whether its data should be stored for that sampling point)).

Other rasterisation arrangements would, of course, be possible.

As shown in FIG. 1, the rasteriser 3 also has an early "hierarchical" depth (Z) and stencil testing stage 4 associated with it. This hierarchical depth and stencil testing stage 4 performs "early" depth and stencil tests on the patches generated by the rasteriser 3 to see if those patches can be culled.

To do this, each patch of sampling points (of fragments, in effect) generated by the rasteriser is sent to the early hierarchical depth and stencil test stage 4, which then performs a Z (depth) test on the patch of sampling points (of fragments) to see if the patch can be discarded (culled) at this stage. To do this, the early hierarchical depth and stencil tester 4 derives a depth value range for each patch it receives from the rasteriser 3 by taking appropriate depth samples across the patch, and compares that depth value range with a previously derived and stored depth value range associated with the sampling (fragment) positions that the patch covers, to try to determine whether the patch will be occluded by or overdraw other fragments and sampling points to be rendered (e.g. that are further on in the pipeline or that have already been rendered) or not. At the same time, an early stencil test is carried out.

If the patch being tested fails the early depth and stencil test, it is discarded (culled) from any further processing.

If the patch being tested passes the early depth and stencil test, it is returned to the rasteriser 3 for further subdivision into smaller, "sub-patches", as discussed above. Each "sub-patch" is then returned to the early depth and stencil tester 4 for testing, and so on, until the minimum patch size is reached.

The depth value ranges that are used by the early hierarchical depth and stencil testing stage 4 when performing depth and stencil tests on patches of plural sampling points that it receives from the rasteriser 3 are stored in the depth and stencil buffers 5. A range of depth values (and a stencil value) is stored in the depth and stencil buffer 5 for each patch size and position that the buffer represents (essentially for each patch size and position that the rasteriser 3 could generate for the tile that is being processed).

The depth value range that is stored for each patch is initially set to a default value, or to an expected depth value range for the patch if that can be determined. (In some arrangements, the range of possible depth values that primitives for a tile may have may be known in advance. This can then be used to populate the depth buffer 5 with ranges of expected depth values for the patches in question.) The stored patch depth value ranges are then updated as patches and/or sampling points being tested by the early hierarchical depth and stencil testing stage 4, the early depth and stencil testing stage 13, and the late depth and stencil testing stage 7, pass the respective depth and stencil tests.

The early hierarchical depth and stencil test stage 4 is configured to operate in an appropriately conservative manner, as is known in the art.

Once the minimum patch size is reached (a patch of 2×2 fragments in this embodiment), the rasteriser 3 issues fragments that represent the patches (and thus sampling points) that pass the early hierarchical Z and stencil test stage 4 to the remainder of the graphics processing pipeline for processing.

The first part of this processing is to subject each fragment issued (output) by the rasteriser 3 to an early depth and stencil test in the early depth and stencil test stage 13. This early depth and stencil test stage 13 performs depth and stencil tests on the individual (covered) sampling positions associated with the fragments issued by the rasteriser 3 (i.e. at a per-sampling point resolution).

To do this, the early depth and stencil tester 13 uses per-sampling position depth and stencil values stored in the depth and stencil buffers 5. Thus, the depth and stencil buffers 5 store, in addition to the per-patch depth value ranges, an appropriate depth (Z) value and stencil value, respectively, for each sampling point that the buffer represents (essentially for each sampling point position of the tile that is being processed). These values are stored in the depth and stencil buffers 5 when sampling points being tested by the early depth and stencil testing stage 13 and the late depth and stencil testing stage 7 pass the respective depth and stencil tests.

The depth and stencil buffers 5 are configured as two distinct buffers (although they may in the same physical memory) in this embodiment, one buffer storing per-patch depth ranges, and the other storing per-sample depth values. Other arrangements would, of course, be possible.

The early depth and stencil test stage 13 is again configured to operate in an appropriately conservative manner, as is known in the art.

Fragments that pass the early depth and stencil test stage 13 (i.e. fragments having at least one associated sampling position that passes the early depth and stencil test stage 13) are then sent onwards to the fragment shading stage 6 (the renderer), as shown in FIG. 1.

(Fragments that fail the early depth and stencil test stage 13 are culled by the early depth and stencil test stage 13, as is known in the art.)

The fragment shading stage 6 performs the appropriate fragment processing (rendering) operations on the fragments it receives, so as to process the fragments to generate the appropriate fragment data, etc., for the render output (e.g. for display of the fragments), as is known in the art.

This fragment processing may include any suitable and desired fragment shading processes, such as executing fragment shader programs on the fragments, applying textures to the fragments, applying blending, fogging or other operations to the fragments, etc., to generate the appropriate fragment data, as is known in the art. In the present embodiment, the fragment shading stage 6 is in the form of a shader pipeline (a programmable fragment shader), but other arrangements, such as the use also or instead of fixed function fragment shading units would be possible, if desired.

There is then a "late" fragment Z and stencil test stage 7, which (if it is to be performed, e.g. where a fragment did not undergo the early Z and stencil test) carries out, inter alia, the end of pipeline depth test on the shaded fragments (on the covered sampling points associated with shaded fragments) to determine whether the sampling points that a rendered fragment represents will overdraw the fragments whose values are currently stored in the tile buffer 5 (i.e. determines whether the fragment data for the fragments issuing from the fragment shading stage 6 should be stored in the tile buffers (should replace or modify the fragment data in the tile buffer(s) of the fragments that have already been rendered)).

To do this, the late depth test stage 7 compares the depth values of (associated with) the fragments issued from the fragment shading stage 6 with the (per-sampling position) depth values stored in the depth buffer 5 for the sampling positions in question. The depth values for sampling points that pass the late depth test 7 are also written appropriately to the Z-buffer 5 to update it, as is known in the art.

This late fragment depth and stencil test stage 7 also carries out any necessary "late" alpha and/or stencil tests on the fragments.

The fragments that pass the late fragment test stage 7 are then subjected to any remaining operations necessary on the fragments, such as blending with the framebuffer, dither etc. (not shown).

Finally, the output fragment data values are written to appropriate tile buffers 8 that store, as is known in the art, an appropriate, e.g. colour, value for each sampling point that the buffers represent (in essence for each sampling point of the tile that is being processed).

Once each tile has been processed, its data is, e.g., exported from the tile buffers 8 to a main memory (e.g. to a frame buffer in a main memory) (not shown) for storage, and the next tile is then processed, and so on, until sufficient tiles have been processed to generate the entire render output (e.g. frame (image) to be displayed).

Other arrangements for the fragment processing pipeline would, of course, be possible.

The above describes the basic rasterisation and rendering process of the graphics processing system shown in FIG. 1. The operation of the graphics processing system shown in FIG. 1 in accordance with an embodiment of the technology described herein will now be described.

As discussed above, prior to the rasterisation and rendering stages of the graphics processing system shown in FIG. 1, there is a primitive depth sorting stage 9. This primitive depth sorting stage operates to sort successive sub-sets of primitives in the stream of primitives 2 received by the graphics processing system 1 for the tile being processed (i.e. in the set of primitives in the tile list for the tile in question) based on their depth values, with the so-sorted primitives then being output from the primitive depth sorting stage 9 in their sorted depth order to the rasteriser 3 of the graphics processing system 1, as shown in FIG. 1.

The effect of this is that the primitives entering the rasteriser 3 will be in depth order. This will have the effect of making the depth test stages of the graphics processing pipeline 1 more efficient in their hidden surface removal operations, because, e.g., the front-most primitive in the sub-set of primitives that has been sorted by the primitive depth sorting stage 9 will be processed first, and so that primitive will then tend to occlude (and be found by the depth testing stages to occlude) primitives that are received later for processing.

In this embodiment, the set (stream) of primitives 2 that is input to the primitive depth sorting stage 9 will comprise the set (stream) of primitives that is to be processed for the current tile of the render output that is being generated (as the graphics processing system 1 is a tile-based system). Other arrangements would, of course, be possible.

As shown in FIG. 1, the primitive depth sorting stage 9 includes a primitive queue 10, a primitive re-ordering processor 11, a primitive output order index list 14, and an output buffer 12. The primitive queue 10 operates to hold a sub-set of primitives from the primitive set (stream) 2 while they are sorted based on their depth values within the tile in question, and then once the sorting has been completed, the first primitive in the sorted order is allowed to exit from the queue 10 to the output buffer 12 and a new primitive from the set (stream) of primitives 2 is input to the queue 10 for sorting, and so on. In this way, the primitive depth sorting stage 9 depth sorts successive (and overlapping) sub-sets of primitives from the set of primitives 2 for the tile in question.

The primitives are then output from the output buffer 12 to the rasteriser 3 and the remainder of the graphics processing pipeline for processing.

In the present embodiment, the primitive queue 10 is sized so as to hold eight primitives. This means that each sub-set of primitives that is depth sorted will comprise at most eight primitives. Other arrangements would, of course, be possible.

The following state information is used for each primitive as an input to the depth sorting process: minimum and maximum depth value (this may be determined as desired), blend uses destination, occlusion query mode, shader has side effects, and stencil test enable. In addition to this, the following additional state information is stored per primitive for the depth sorting process: an output order index idx, and a "can-be-re-ordered" flag.

As shown in FIG. 1, rather than re-ordering the primitives themselves in the queue 10, a separate list of primitive output order indices 14 is maintained.

Each primitive in the queue 10 has an associated output order index in the output order index list 14. As the primitive queue 10 can hold eight primitives, 3-bit output order indices are used for this purpose. (Other arrangements would, of course, be possible.)

The primitive output order indices in the primitive output order index list 14 are updated by the primitive re-ordering processor 11 based on the depth value ranges associated with the primitives in the queue 10 (this will be discussed in more detail below).

The primitive output order indices in the output order index list 14 are updated in the last cycle of the depth sort process. Then, the primitive whose output order index indicates that it should be output next is output to the output buffer 12, and the primitive that is currently ready to exit the output buffer 12 is provided to the rasteriser 3 for processing. A new primitive is then input to the primitive queue 10 and the sorting process is performed again with that new primitive, and so on.

Other arrangements, such as re-ordering the primitives directly (without using indices), would be possible, if desired.

In the present embodiment, the sorting arrangement is such that the primitive queue 10 has to be full before primitives can start exiting the queue when the sorting process starts (unless some event triggers early-emptying of the queue). This can improve the sorting quality and ensures that a given set of primitives will be sorted in the same order, regardless of timing differences. Other arrangements, such as simply allowing primitives to start exiting the queue 10 before it is full at the start of the sorting process would also be possible, if desired.

In the present embodiment, primitives are allowed to exit the queue (the queue is emptied) even if the queue is not full yet when a primitive for the next tile arrives, and/or a primitive that cannot be re-ordered enters (is input to) the queue (the reason for this is that if an input primitive cannot be reordered (sorted), there is less latency if it is sent out from the queue earlier). The queue is not made empty before the new primitives enter, the old primitives are simply allowed to exit before the queue is full.

(At the end of the sorting process (i.e. as the final few primitives in the set of primitives the tile in question has reached), the queue 10 will progressively empty of primitives with no new primitives entering the queue. Then, once all the primitives for a given tile have been sorted and output from the queue 10, the next tile can be sorted, and so on.)

Figure 2:
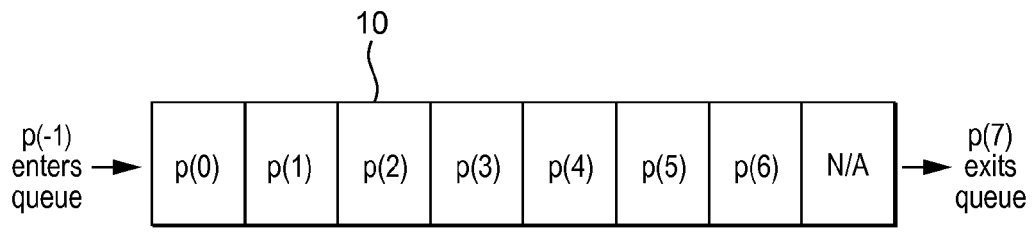
FIG. 2 shows schematically the operation of the primitive sorting queue in the described embodiments of the technology described herein.
Figure 3:
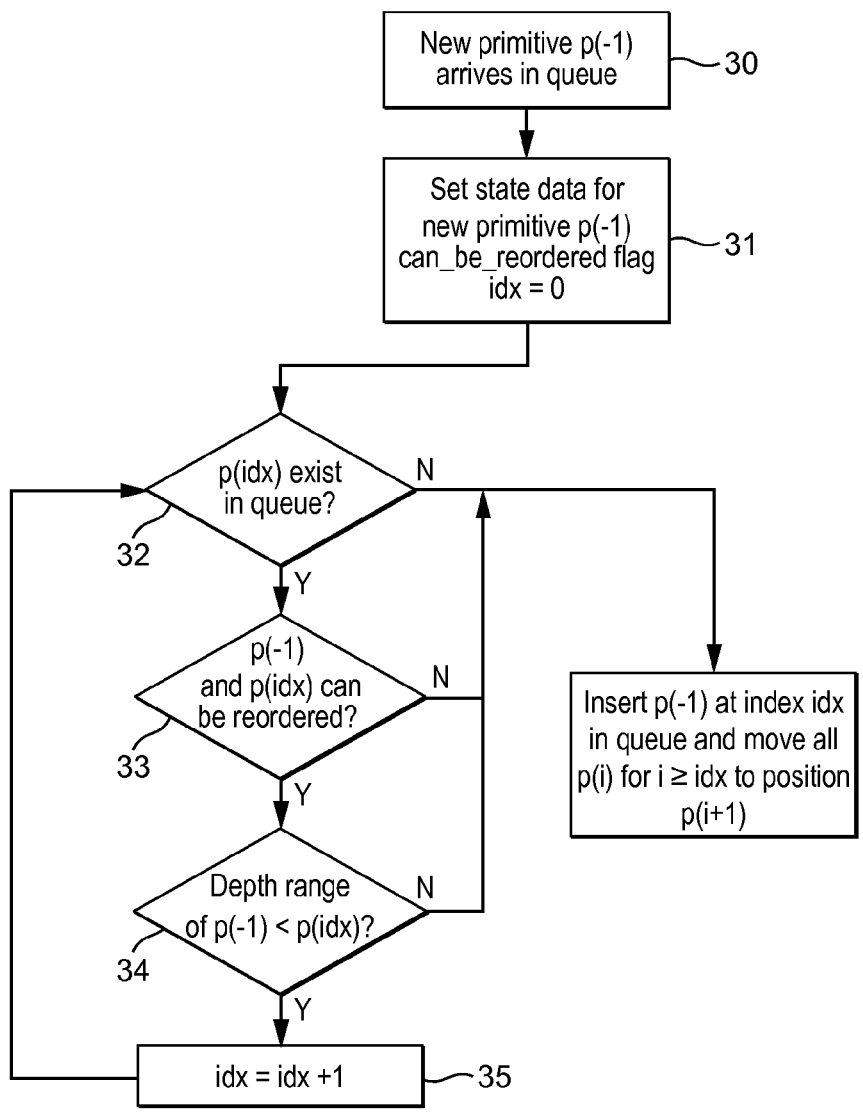
FIG. 3 shows schematically the primitive sub-set sorting process of one embodiment of the technology described herein.
Figure 4:
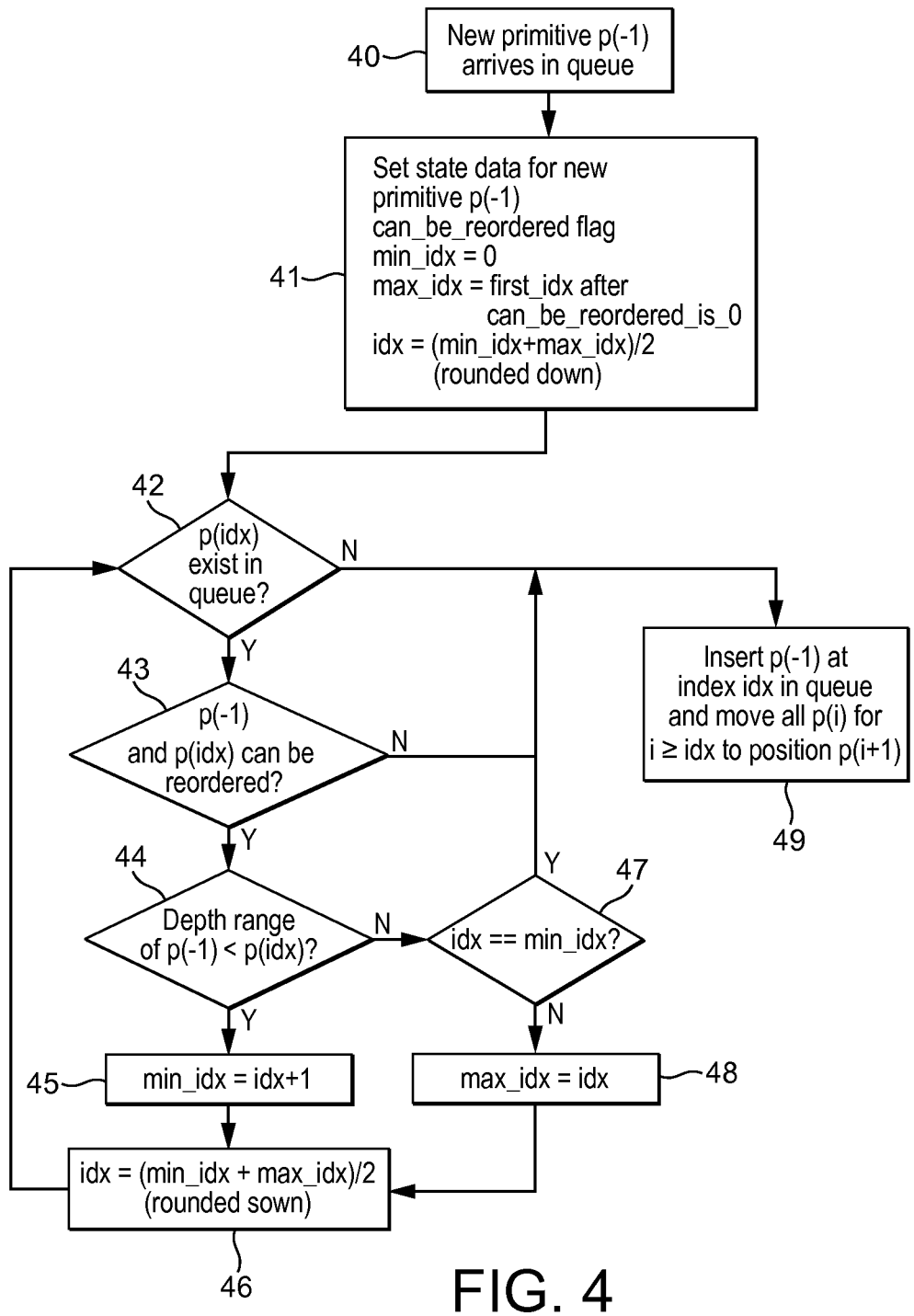
FIG. 4 shows schematically the primitive sub-set sorting process of another embodiment of the technology described herein.

FIGS. 2, 3 and 4 show schematically the primitive sub-set sorting process that is implemented by the primitive re-ordering processor 11.

FIG. 2 shows schematically the primitive queue 10 (which can be viewed as being a depth sorting window). As shown in FIG. 2, each primitive in the queue has an associated index 0-7 that indicates its position in the queue. The primitive having the index 7 is at the head of the queue (is the next primitive to exit the queue) and the primitive having the index 0 is at the tail of the queue (i.e. the primitives will be output from the queue 10 in the index order 7 to 0).

FIG. 2 shows the situation where the primitive P(7), i.e. the primitive having the index 7 at the head of the queue, has exited the queue 10 and a new primitive, labelled with the index P(−1) for illustration purposes, enters the queue 10 for sorting.

FIG. 3 shows schematically a first embodiment the operation of the primitive re-ordering processor 11 when a new primitive arrives in the queue 10.

As shown in FIG. 3, when the new primitive P(−1) arrives in the queue 10 (step 30), the first step of the process is to set the relevant state data for the new primitive P(−1) (step 31).

The first state data that is set for the new primitive P(−1) is a "can be re-ordered" flag that indicates whether the new primitive is allowed to be re-ordered in the primitive set (stream) or not. To set this flag, the occlusion query mode, stencil test, shader has side effects, and blend uses destination states set for the primitive entering the queue are checked. If none of these states is enabled, the "can be re-ordered" flag for the primitive is set to indicate that the primitive can be re-ordered in the primitive set (stream). On the other hand, if any of the occlusion query mode, stencil test, shader has side effects and blend uses destination modes are enabled, then the "can be re-ordered" flag is set to indicate that the primitive in question cannot be re-ordered in the primitive set.

As the present embodiment uses a "less than" depth test to re-order the primitives, it is also checked if the depth test state is a "less than" depth test or not. This is done by checking the state of the greater than bit and the equal bit of the depth test for the primitive. If the depth test being used is not a "less than" depth test, then the primitive re-ordering is disabled (i.e. the "can be re-ordered" flag is set to indicate that the primitive in question cannot be re-ordered in the primitive set).

As well as setting the "can be re-ordered" flag appropriately, the index idx for the index position within the queue 10 that the new primitive P(−1) will have (and thus, effectively, the index for the primitive in the queue 10 that the new primitive P(−1) is to be compared with) is initialised to "0". The effect of this is that at the start of the primitive sorting process, the new primitive P(−1) entering the queue will be first compared with the primitive having the index 0 in the queue, P(0), i.e. the primitive at the tail of the queue, and the new primitive P(−1) entering the queue will initially be assumed to be taking the position of index 0 in the queue (i.e. the position at the tail of the queue 10).

Once the state data of the new primitive P(−1) has been set, the primitive re-ordering processor 11 then checks if there is a primitive at the index position idx that the new primitive is due to be compared with (step 32). This effectively checks if the primitive being sorted has reached the head of the queue (i.e. whether there is still a primitive in the queue in front of the primitive that is being sorted for it to be compared against).

If there isn't another primitive in the queue 10 for the primitive being sorted to be compared against (i.e. the new primitive has reached the head of the queue in the sorting process), the process moves to the end stage of allocating the primitive to its position in the queue. This will be discussed in more detail below.

If there is a primitive in the queue that the primitive being sorted should be compared against, the primitive re-ordering processor 11 then determines if both the primitive being sorted and the next primitive in the queue that it is to be compared against can be re-ordered in the queue (i.e. have their "can be re-ordered" flags set or not) (step 33).

If the "can be re-ordered" flag for either primitive is set to indicate that the primitive cannot be re-ordered, then the sorting process is stopped (as at least one of the primitives in question cannot be re-ordered), and the process again moves to the end stage of allocating the primitive to its position in the queue.

The effect of this is that if it is determined that a primitive should not be re-ordered in the primitive set, then the primitive depth sorting stage 9 will operate to ensure that later primitives don't re-order in front of that primitive (such that the primitive order before (in time) the primitive that cannot be re-ordered is maintained). (Effectively, the primitive sorting arrangement operates to constrain the window within the primitive queue 10 over which a new primitive is sorted to always be behind any primitive in the queue 10 that it has been determined should not be re-ordered (should not have its position relative to the later primitives in the primitive set changed).)

If both primitives' "can be re-ordered" flags are set to indicate that the primitives can be re-ordered, then the primitive re-ordering processor 11 operates to compare the depth range within the tile in question associated with the new primitive (with the primitive currently being sorted) with the depth range within the tile in question of the primitive in the queue (of the next primitive in the queue) it is to be compared against (step 34). The depth ranges used for this process are based on the minimum and maximum depth values associated with the primitives.

In the present embodiment it is determined whether the depth values of the new primitive (of the primitive being sorted) are less than the depth values of the next primitive in the queue that it is being compared against. The effect of this is that the primitives will be sorted into front-to-back order based on the depth value ranges associated with the primitives. A primitive is not re-ordered in relation to a primitive that is in the queue where the depth ranges of the primitives (within the tile) are overlapping.

Other forms of depth value and range sorting and comparison would be possible, for example depending upon the nature of the depth function that is being used for the tile in question (e.g. the sorting order could be based on and determined by and appropriate to the depth function that is being used).

If the depth values of the new primitive are all greater than the depth values of the next primitive in the queue (i.e. such that the new primitive, according to its depth values, lies behind the next primitive in the queue), then the new primitive should remain behind (nearer to the tail of the queue than) the primitive that it is currently being compared against in the queue. In this case, the new primitive's (depth) position in the queue has been found, and so the process moves to the end stage of allocating the primitive to its position in the queue.

If the depth values of the new primitive are all less than the depth values of the next primitive in the queue (i.e. such that the new primitive, according to its depth values, lies in front of the next primitive in the queue), then the new primitive should be placed before (nearer to the head of the queue than) the primitive that it is currently being compared against in the queue, and the sorting process should then compare the new primitive with the next primitive in the queue, and so on.

To achieve this, as shown in FIG. 3, if the range of depth values covered by the new primitive (the primitive being sorted) is less than the range of depth values of the primitive that it is currently being compared against, the index idx (i.e. the index within the tile for the new primitive (i.e. for the primitive that is currently being sorted) and of the primitive to be compared against) is incremented by one (step 35). This effectively moves the new primitive one place forward in the queue 10.

The comparison process is then repeated with the next primitive in the queue 10, and so on, until either it is determined at step 32 that the end of the queue has been reached, or it is determined at step 33 that a primitive that cannot be re-ordered in the queue has been reached, or it is determined at step 34 that a primitive in the queue that the primitive currently being sorted does not lie in front of has been reached.

Once the end of the sorting process has been identified in steps 32, 33 or 34, the primitive being sorted is allocated as its index in the queue the current index idx that it has (step 36). All the primitives whose index, idx, in the queue was equal to or greater than the index position allocated to the new primitive then have their indices idx incremented by 1, so as to, in effect move them to the next higher position in the queue (step 36). This effectively inserts the new primitive in the queue 10 at the index, idx, position in question.

As can be seen from FIG. 3, the effect of this operation is that when a new primitive enters the queue and is sorted within the queue 10, the new primitive is checked in sequential order against the primitives already in the queue 10 to see if the new primitive can be drawn before the previous primitive. If the new primitive can be drawn in front of a previous primitive, then that new primitive is tested against the next earlier primitive in the queue, and so on, until the end (head) of the queue or a primitive that the new primitive's order should not be swapped with is reached (either because the new primitive does not lie in front of the primitive, or the new primitive or the primitive in the queue is prohibited from being re-ordered). At this point, the output order index values for the primitives are updated for all primitives that will be re-ordered as a consequence of the new primitive entering the queue.

The ordering is done by maintaining a list of output order indices for the primitives and updating that list (by changing the output order indices associated with the respective primitives appropriately), once the sorting process for a given primitive reaches its conclusion.

As will be appreciated from the above, the primitive depth sorting process illustrated in FIG. 3 essentially performs a linear sort to determine the depth position of the primitive in the queue.

FIG. 4 shows an alternative arrangement where the depth comparison and sorting is done in a logarithmic manner (i.e. using a logarithmic (binary) search technique). Thus, in this case, the new primitive is tested against the depth values of the mid-point primitive (in depth order) of the primitives in the queue, and the sorting process then iterates to the appropriate next mid-point primitive (based on the depth values), and so on, until the depth position of the new primitive in the queue 10 has been determined.

As shown in FIG. 4, when the new primitive P(−1) arrives in the queue 10 (step 40), the first step of the process is again to set the relevant state data for the new primitive P(−1) (step 41).

Again, the first state data that is set for the new primitive P(−1) is a "can be re-ordered" flag that indicates whether the new primitive is allowed to be re-ordered in the primitive set (stream) or not. As in the embodiment shown in FIG. 3, to set this flag, the occlusion query mode, stencil test, shader has side effects, and blend uses destination states set for the primitive entering the queue are checked. If none of these states is enabled, the "can be re-ordered" flag for the primitive is set to indicate that the primitive can be re-ordered in the primitive set (stream). On the other hand, if any of the occlusion query mode, stencil test, shader has side effects and blend uses destination modes are enabled, then the "can be re-ordered" flag is set to indicate that the primitive in question cannot be re-ordered in the primitive set.

As the present embodiment again uses a "less than" depth test to re-order the primitives, it is also checked if the depth test state is a "less than" depth test or not. This is done by checking the state of the greater than bit and the equal bit of the depth test for the primitive. If the depth test being used is not a "less than" depth test, then the primitive re-ordering is disabled (i.e. the "can be re-ordered" flag is set to indicate that the primitive in question cannot be re-ordered in the primitive set).

As well as setting the "can be re-ordered" flag appropriately, the index idx for the index position within the queue 10 that the new primitive P(−1) will have (and thus, effectively, the index for the primitive in the queue 10 that the new primitive P(−1) is to be compared with) is initialised. However, in this embodiment, rather than initialising the index idx for the new primitive to "0", the index idx for the new primitive is set to the index of the mid-point primitive in the portion of the queue 10 (starting from the tail of the queue) in which the primitives can be re-ordered (sorted).

This is achieved by setting a minimum index, min_idx, value to "0", and a maximum index value, max_idx, to the value of the first index before the first primitive in the queue (counting from the tail of the queue) that cannot be re-ordered (that has its can be re-ordered flag set to indicate that the primitive cannot be re-ordered). (The effect of this is that the maximum index value will either be the index at the head of the queue if all the primitives in the queue can be re-ordered, or will be the index of the primitive in the queue that is behind (relative to the head of the queue) the primitive furthest back in the queue that cannot be re-ordered.) The index idx for the new primitive is then initialised to the mid-point between the minimum index and maximum index values (rounded down).

The effect of this is that at the start of the primitive sorting process, the new primitive P(−1) entering the queue will be first compared with the primitive lying in the middle of the group of primitives within the queue starting from the tail of the queue that can be re-ordered (and thus with the mid-point primitive in the queue if all the primitives in the queue can be re-ordered).

Once the state data of the new primitive P(−1) has been set, the primitive re-ordering processor 11 then checks if there is a primitive at the index position idx that the new primitive is due to be compared with (step 42). This effectively checks if the primitive being sorted has reached the head of the queue (i.e. whether there is still a primitive in the queue in front of the primitive that is being sorted for it to be compared against).

If there isn't another primitive in the queue 10 for the primitive being sorted to be compared against (i.e. the new primitive has reached the head of the queue in the sorting process), the process moves to the end stage of allocating the primitive to its position in the queue. This will be discussed in more detail below.

If there is a primitive in the queue that the primitive being sorted should be compared against, the primitive re-ordering processor 11 then determines if both the primitive being sorted and the primitive in the queue that it is to be compared against can be re-ordered in the queue (i.e. have their "can be re-ordered" flags set or not) (step 43).

If the "can be re-ordered" flag for either primitive is set to indicate that the primitive cannot be re-ordered, then the sorting process is stopped (as at least one of the primitives in question cannot be re-ordered), and the process again moves to the end stage of allocating the primitive to its position in the queue.

As before, the effect of this is that if it is determined that a primitive should not be re-ordered in the primitive set, then the primitive depth sorting stage 9 will operate to ensure that later primitives don't re-order in front of that primitive (such that the primitive order before (in time) the primitive that cannot be re-ordered is maintained). (Effectively, the primitive sorting arrangement operates to constrain the window within the primitive queue 10 over which a new primitive is sorted to always be behind any primitive in the queue 10 that it has been determined should not be re-ordered (should not have its position relative to the later primitives in the primitive set changed).)

If both primitives' "can be re-ordered" flags are set to indicate that the primitives can be re-ordered, then the primitive re-ordering processor 11 operates to compare the range of depth values within the tile in question associated with the new primitive (with the primitive currently being sorted) with the depth range within the tile in question of the primitive in the queue it is to be compared against (step 44). As before, the depth ranges used for this process are based on the minimum and maximum depth values associated with the primitives.

In this embodiment it is again determined whether the depth values of the new primitive (of the primitive being sorted) are less than the depth values of primitive in the queue that it is being compared against. The effect of this is that the primitives will be sorted into front-to-back order based on the depth value ranges associated with the primitives. A primitive is not re-ordered in relation to a primitive that is in the queue where the depth ranges of the primitives (within the tile) are overlapping.

Again, other forms of depth value and range sorting and comparison would be possible, for example depending upon the nature of the depth function that is being used for the tile in question (e.g. the sorting order could be based on and determined by and appropriate to the depth function that is being used).

If the depth values that the new primitive covers are all greater than the range of depth values of the primitive in the queue that the new primitive is being compared to (i.e. such that the new primitive lies behind that primitive in the queue according to its depth values), then, as before, the new primitive should remain behind (nearer to the tail of the queue than) the primitive that it is currently being compared against in the queue. In this case, because the sorting process operates using a logarithmic (binary) search to identify the position of the primitive in the queue, the process operates to then compare the new primitive's depth value range with the mid-point primitive in the portion of the primitive queue that it has now been determined the new primitive falls within.

To achieve this, as shown in FIG. 4, firstly it is determined whether the current index position for the primitive is exactly equal to the current minimum index, min_idx, value (step 47). If so, the new primitive's (depth) position in the queue has been found, and so the process moves to the end stage of allocating the primitive to its position in the queue.

If the new primitive's current index position is not exactly equal to the current minimum index value, min_idx, then that means that there is still a portion of the primitives in the queue for the new primitive to be compared against. In that case, the maximum index value being used for the search process, max_idx, is set to the primitive's current index value, idx (step 48). This essentially constrains the portion of the queue that the new primitive will now be sorted against to lie behind the current index position that it has been found that the new primitive lies behind.

The index, idx, for the new primitive (and thus for the primitive that the new primitive should next be compared against) is then recalculated as the mid-point index between the current minimum index and maximum index values (rounded down) (step 46). This effectively moves the primitive to the mid-point position in the portion of the queue that it is now known the primitive will fall within according to its depth values.

If the depth values that the new primitive covers are all less than the range of depth values of the primitive in the queue that the new primitive is being compared to (i.e. such that the new primitive lies in front of that primitive in the queue according to its depth values), then the new primitive should be placed in front of (closer to the head of the queue than) the primitive that it is currently being compared against in the queue. In this case, because the sorting process operates using a logarithmic (binary) search to identify the position of the primitive in the queue, the process operates to then compare the new primitive's depth value range with the mid-point primitive in the portion of the primitive queue that it has now been determined the new primitive falls within.

To achieve this, as shown in FIG. 4, the minimum index value being used for the search process, min_idx, is set to the primitive's current index value plus one, idx+1 (step 45). This essentially constrains the portion of the queue that the new primitive will now be sorted against to lie in front of (nearer to the head of the queue than) the current index position that it has been found that the new primitive lies in front of.

The index, idx, for the new primitive (and thus for the primitive that the new primitive should next be compared against) is then recalculated as the mid-point index between the current minimum index and maximum index values (rounded down) (step 46). This effectively moves the primitive to the mid-point position in the portion of the queue that it is now known the primitive will fall within according to its depth values.

The comparison process is then repeated with the new "mid-point" primitive, and so on, until either it is determined at step 42 that the end of the queue has been reached, or it is determined at step 43 that a primitive that cannot be re-ordered in the queue has been reached, or it is determined at step 47 that the primitive in the queue that the primitive currently being sorted lies immediately in front of has been reached. In this way, a logarithmic (binary) search is used to find the position of the primitive in the queue.

Once the end of the sorting process has been identified in steps 42, 43 or 47, the primitive being sorted is allocated as its index in the queue the current index idx that it has (step 49). All the primitives whose index, idx, in the queue was equal to or greater than the index position allocated to the new primitive then have their indices idx incremented by 1, so as to, in effect move them to the next higher position in the queue (step 49). This effectively inserts the new primitive in the queue 10 at the index, idx, position in question.

As can be seen from FIG. 4, the effect of this operation is that when a new primitive enters the queue and is sorted within the queue 10, the new primitive is checked in a logarithmic (binary) search order against the primitives already in the queue 10 to see if the new primitive can be drawn before the previous primitive. Once the search is finished, the output order index values for the primitives are updated for all primitives that will be re-ordered as a consequence of the new primitive entering the queue.

Again, the ordering is done by maintaining a list of output order indices for the primitives and updating that list (by changing the output order indices associated with the respective primitives appropriately), once the sorting process for a given primitive reaches its conclusion.

Where a logarithmic (binary) searching process as in FIG. 4 is used to find the depth value that a primitive should be allocated to in the queue, then where the depth sorting is based on depth ranges (minimum and maximum depth values) associated with the primitives, the logarithmic search process is in an embodiment performed as follows, as this will then reduce the risk of overlapping depth ranges being re-ordered incorrectly by the depth sorting process.

Firstly, rather than storing the minimum and maximum depth values in association with the primitives in the queue, an array (list) of minimum depth values that spans between the oldest sortable primitive (i.e. a primitive that can be re-ordered) and the new primitive is stored, with each minimum depth value in the array having associated with it an index to the primitive that actually has that depth value.

Then, where a new primitive has a "less than" depth test associated with it, the maximum depth value of that primitive is used to do a logarithmic search within the array of minimum depth values, to find the two minimum depth values that the new primitive's maximum depth value is in between.

The position in the queue for the new primitive will then be indicated by the index associated with the minimum depth value that was the lowest of the two minimum depth values that the new primitive's maximum depth value was found to lie between. (For example if the new primitive has a maximum depth value of 0.4 and it was found to lie between the minimum depth values 0.3 and 0.5, with 0.5 being primitive index 5 and 0.5 being primitive index 2, the new primitive should be re-ordered to be rendered (drawn) before all the primitives with index 0, 1, 2, 3 and 4.)

In the special case where the new primitive's maximum depth value is less than the lowest previous minimum depth value (such that you don't then find an associated index to insert the primitive at), the new primitive is re-ordered to be drawn before all the re-orderable primitives in the queue (e.g. inserted after the previous primitive that has its can be re-ordered flag set to indicate that it can't be re-ordered (if any)).

After the new primitive's position has been determined, and the queue re-ordered, the minimum depth value for the new primitive (and its associated primitive index) is inserted into the array of minimum depth values in the appropriate position (thus in the above example between 0.3 and 0.5).

If the new primitive's minimum depth value is less than or equal to both the existing primitives' minimum depth values, then the lesser of the two existing minimum depth values is removed from the minimum depth value list. This process is then repeated until the lesser of the two existing minimum depth values are either replaced by a lesser value than the new minimum depth value, or there are no more earlier minimum depth values remaining. (The removal process can be linear since every element can only be removed once (and thus is still more efficient than a linear search would be).)

The above process can also be used in a corresponding fashion when primitives are to be subjected to a "greater than" depth test. In this case, a maximum depth value list (array) should be used instead of the minimum depth value list (array), and then the minimum depth value of the new primitive searched against that maximum depth value array, with the maximum depth value array (list), etc., being updated in the correspondingly converse fashion to the case for the minimum depth value array (list).

It would also be possible to switch between "greater than" and "less than" depth testing. In this case, when using an array of minimum depth values for a "less than" depth test, a maximum depth value list would also need to be remembered for all the primitives in the list, and vice-versa. Then, when switching between the lists, the min/max list could be removed and replaced with a single entry which was the stored min/max value having the index of the primitive to be drawn last. The max/min value would then be replaced by the respective max/min value of the old list (which will be the first entry).

In this case, the same storage area/registers could be used for both the min/max lists and values since they won't be used both at the same time.

So far as other forms of depth tests are concerned, a "less than or equal" depth test can be treated the same as the "less than" depth test, and a "greater than or equal" depth test can be treated the same as the "greater than" depth test. "Equal", "not equal", "never pass" and "always pass" depth tests are in an embodiment handled by disabling the sorting (i.e. the can be re-ordered flag is set to indicate that the primitive should not be sorted). However, in the case of an "always pass" depth test, instead of disabling the sorting, it would be possible to re-order such a primitive to the beginning of the list, e.g. if there are other mechanisms to discard fragments generated at the same position by earlier primitives that will now be rendered (drawn) later following the sorting.

Other forms of depth test and switching between different forms of depth test could be handled in the linear sorting arrangement (and for any other searching (sorting) arrangement being used) in a corresponding and appropriate fashion.

Other searching (sorting) arrangements would, of course, be possible. For example, in another embodiment, a full search process that can identify (find) the (depth) position of the primitive in the sub-set in a single processing cycle is used to depth sort the primitives.

In the above embodiments, once the depth sorting in respect of the new primitive that entered the queue 10 has been concluded, the primitive at the head of the queue 10 (i.e. the primitive in the queue associated with the output order index 7) is output from the queue 10 to the output buffer 12. The next primitive in the set then enters the queue 10 and the sorting process is repeated for that primitive, and so on. The process is then repeated for the next tile of the render output, and so on.

Although the sorting process of the primitive depth sorter 9 may take a number of cycles, this does not require the subsequent stages of the graphics processing pipeline to be stalled, because as discussed above, each primitive that is input to the rasteriser 3 in effect generates multiple processing tasks for the subsequent stages of the graphics processing pipeline, and so those stages will be kept busy while the sorting process is performed.

(Where, as discussed above, the primitive sorting process is configured such that when the process first starts the primitives are not allowed to exit the primitive queue 10 until the primitive queue 10 is full, there may be an initial delay in primitives exiting the primitive queue 10 to the subsequent stages of the graphics processing pipeline while the primitive queue 10 fills up. However, it is believed that for normal rendering jobs any such potential small initial stalling delay while the primitive queue 10 fills up will be insignificant. Also, it should be noted that in this case, the primitive throughput will still be the same once primitives start to exit the primitive queue 10.)

It will be appreciated from the above that the primitive depth sorting stage 9 effectively sorts the successive sub-sets of primitives (namely each successive set of primitives that is held in the primitive queue 10) from the input set of primitives (primitive stream) 2 based on the primitive depth values and then, where appropriate, outputs the primitives in depth order to the rasterisation process. The effect of this then is that the primitives in the primitive set are effectively depth sorted over a given "window" in the primitive set (stream) and re-ordered. As discussed above, the Applicants have found that such more limited depth sorting over a small window within the primitive set (stream) can still provide significant improvements to the hidden surface removal processes of the graphics processing pipeline.

As will be appreciated from the above, the depth sorting of the primitives is not carried out (is suspended) in respect of certain primitives so as to ensure that where it is necessary to do that, the original primitive order is maintained. In particular, a primitive is not re-ordered (and is not allowed to be re-ordered) in the primitive set if: the primitive does not have an associated depth value; the primitive is to write to the stencil buffer; the primitive has (e.g. shader) side effects; the primitive is to contribute to an occlusion query (an occlusion counter); or the primitive has a blending mode that requires the original primitive position (order) to be maintained. Other criteria would also or instead be possible.

Thus, a primitive is allowed to have other primitives drawn before itself (i.e. it can be re-ordered) if it does not have alpha blending, or it had alpha blending and the depth range indicates the primitive is overdrawn, and it does not have side effects.

A number of variations, modifications and changes to the present embodiment would be possible. For example, a primitive may be allowed to be drawn in front of other primitives (i.e. it can be re-ordered) if the depth range of the primitive is on the visible side of the depth test, and it does not write to stencil or the primitive drawn before it didn't have stencil test set.

In an embodiment, the "allow reorder flag" is also cleared for all earlier primitives if the depth test changes.

In the above embodiment, the primitive depth sorting stage 9 is shown as taking place after the primitives have been tiled (i.e. after the tile lists for the tiles to be rendered have been prepared).

However, it would also be possible to carry out the primitive depth sorting process as part of the tiling process (in the tiler), e.g. before the tile lists are written to memory.

In such an arrangement, if tiling process does not write the tile lists directly to memory, but instead collects writeback data for the most recently tiles and writes them to memory in larger bursts, then the primitives may be re-ordered within the writeback cache before it is written to memory.

If the re-ordering is done in the writeback cache, the following state is in an embodiment stored per primitive internally in the cache: a "Can be reordered" indicator (e.g. flag); and the min z/max z for the primitive.

The primitives may also be culled before the list is written to memory if desired. In this case, a primitive is in an embodiment allowed to be culled if: a new primitive covers the whole tiling level and has non-overlapping depth ranges, and the new primitive does not have stencil test, the new primitive does not have alpha test/alpha to coverage, the new primitive does not have blending, the depth test of the new primitive passes when compared to the old primitive, and the old primitive does not have side effects.

Where the tiling process performs hierarchical tiling (i.e. can tile (list) primitives at different render target area resolutions (sub-divisions), then in an embodiment of such an arrangement, if a primitive that cannot be re-ordered is added to one hierarchical tiling level, then the "allow reorder flag" is in an embodiment cleared for every earlier primitive on the other hierarchical levels that has not yet been written to memory. The flag for the same hierarchical level is in an embodiment not cleared.

It would also be possible to do the primitive reordering (sorting) before the tiling hierarchy level choice for listing the primitives is done.

Where the graphics processing system uses the same index for both ordering primitives and as a basis for a primitive index (e.g. PrimitiveID), then when PrimitiveID is in use, the primitive sorting (reordering) may, e.g., be disabled.

Alternatively, the PrimitiveID may be encoded in a different way, e.g. as part of the primitive command.

Encoding PrimitiveID as part of a compressed command could be done using the following methods: reserving a bit in the compressed format to encode if the delta between the order index and PrimitiveID is 0 or if the delta is encoded within the command, or having a new compressed format with PrimitiveID that allows the bit-width for the different encoded values to be dynamically changed in the encoding scheme.

It can be seen from the above that the technology described herein, in its embodiments at least, provides a mechanism for further reducing the amount of (ultimately redundant) processing of hidden surfaces that may take place in a pipelined graphics processing system.

The technique of the technology described herein is also independent of the level of multi-sampled anti-aliasing being used, thereby making the use of higher order multi-sampled anti-aliasing significantly cheaper.

This is achieved, in the embodiments of the technology described herein at least, by depth sorting successive, limited, sub-sets of primitives to be processed before the primitives are sent to the rasterising and rendering stages of the graphics processing pipeline.

The foregoing detailed description has been presented for the purposes of illustration and description. It is not intended to be exhaustive or to limit the technology described herein to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of operating a graphics processing pipeline that includes rasteriser processing circuitry that rasterises input primitives to generate graphics fragments to be processed, each graphics fragment having one or more sampling points associated with it, and renderer processing circuitry that processes fragments generated by the rasteriser processing circuitry to generate output fragment data, the method comprising:

when the graphics processing pipeline is processing a set of graphics primitives, depth sorting primitives of successive sub-sets of the primitives in the set of graphics primitives prior to the rasteriser processing circuitry generating graphics fragments for processing the primitives;

wherein the step of depth sorting primitives of successive sub-sets of the primitives in the set of graphics primitives prior to the rasteriser processing circuitry generating graphics fragments for processing the primitives comprises: once a sub-set of primitives has been sorted into a sorted sub-set of primitives, passing a primitive in the sorted sub-set of primitives onwards for processing, and adding a next primitive in the set of primitives to the remaining primitives of the sorted sub-set of primitives to generate a new sub-set of primitives for sorting.

2. The method of claim 1, wherein the set of primitives to be processed comprises the primitives that are to be processed to generate a given output tile of a render target to be generated by the graphics processing pipeline.

3. The method of claim 1 wherein the sorting process is performed by one of:

testing a primitive against other primitives in a sub-set of primitives being sorted one-by-one, in a linear order; and testing a primitive against other primitives in a sub-set of primitives being sorted using a logarithmic search process.

4. The method of claim 1, further comprising:

associating each primitive in a sub-set of primitives being sorted with a respective index value; and updating the index values associated with the primitives based on the sorting of the primitives within the sub-set.

5. The method of claim 1 wherein a queue is used to retain a sub-set of primitives being sorted while they are being sorted.

6. The method of claim 1 wherein the primitive depth sorting process comprises:
receiving a graphics primitive in the set of graphics primitives for processing, adding the primitive to a primitive queue, determining the position that the primitive should have in the queue based at least on depth values associated with the primitives in the queue, and once the position the primitive should have in the queue based at least on depth values associated with the primitives in the queue has been determined, outputting a primitive from the head of the queue to the rest of the pipeline.

7. The method of claim 1, comprising only re-ordering by the primitive sub-set sorting process primitives in the primitive set that have particular properties.

8. The method of claim 1, further comprising associating with each primitive in a primitive sub-set, information indicating whether the primitive can be re-ordered in the primitive set or not.

9. The method of claim 1, wherein the graphics processing pipeline is a tile-based graphics processing pipeline, and further comprising performing the primitive sub-set depth sorting process on a per tile basis, and depth sorting the primitives within a tile on the basis of the depth values the primitives have within the tile in question.

10. The method of claim 1, wherein the graphics processing pipeline is a tile-based graphics processing pipeline, and the primitive sub-set depth sorting process is carried out during the tiling process before the tile lists are written to memory.

11. A method of operating a graphics processing pipeline that includes rasteriser processing circuitry that rasterises input primitives to generate graphics fragments to be processed, each graphics fragment having one or more sampling points associated with it, and renderer processing circuitry that processes fragments generated by the rasteriser processing circuitry to generate output fragment data, the method comprising:
when the graphics processing pipeline receives a graphics primitive for processing, prior to the rasteriser processing circuitry generating graphics fragments for processing the primitive, adding the primitive to a primitive queue, determining the order in which the primitive should exit the queue based on depth values associated with the primitives in the queue, and outputting primitives from the queue to the rest of the pipeline in the exit order determined based on the depth values associated with the primitives in the queue.

12. A graphics processing pipeline comprising:
rasteriser processing circuitry that rasterises input primitives to generate graphics fragments to be processed, each graphics fragment having one or more sampling points associated with it;
renderer processing circuitry that processes fragments generated by the rasteriser processing circuitry to generate output fragment data; and
primitive depth sorter processing circuitry configured to:
when the graphics processing pipeline is processing a set of graphics primitives, depth sort primitives of successive sub-sets of the primitives in the set of graphics primitives prior to the rasteriser processing circuitry generating graphics fragments for processing the primitives;
wherein the step of depth sorting primitives of successive sub-sets of the primitives in the set of graphics primitives prior to the rasteriser processing circuitry generating graphics fragments for processing the primitives comprises: once a sub-set of primitives has been sorted into a sorted sub-set of primitives, passing a primitive in the sorted sub-set of primitives onwards for processing, and adding a next primitive in the set of primitives to the remaining primitives of the sorted sub-set of primitives to generate a new sub-set of primitives for sorting.

13. The graphics processing pipeline of claim 12, wherein the set of primitives to be processed comprises the primitives that are to be processed to generate a given output tile of a render target to be generated by the graphics processing pipeline.

14. The graphics processing pipeline of claim 12, wherein the primitive depth sorter processing circuitry is configured to perform at least one of:
testing a primitive against other primitives in a sub-set of primitives being sorted one-by-one, in a linear order; and
testing a primitive against other primitives in a sub-set of primitives being sorted using a logarithmic search process.

15. The graphics processing pipeline of claim 12, wherein the primitive depth sorter processing circuitry is configured to:
associate each primitive in a sub-set of primitives being sorted with a respective index value; and
update the index values associated with the primitives based on the sorting of the primitives within the sub-set.

16. The graphics processing pipeline of claim 12, further comprising:
a queue that retains a sub-set of primitives being sorted while they are being sorted.

17. The graphics processing pipeline of claim 12, wherein the primitive depth sorter processing circuitry is configured to:
receive a graphics primitive in the set of graphics primitives for processing, add the primitive to a primitive queue, determine the position that the primitive should have in the queue based at least on depth values associated with the primitives in the queue, and once the position the primitive should have in the queue based at least on depth values associated with the primitives in the queue has been determined, output a primitive from the head of the queue to the rest of the pipeline.

18. The graphics processing pipeline of claim 12, wherein the primitive depth sorter processing circuitry is configured to:
only re-order by the primitive sub-set sorting process primitives in the primitive set that have particular properties.

19. The graphics processing pipeline of claim 12, wherein the primitive depth sorter processing circuitry is configured to:
associate with each primitive in a primitive sub-set, information indicating whether the primitive can be re-ordered in the primitive set or not.

20. The graphics processing pipeline of claim 12, wherein the graphics processing pipeline is a tile-based graphics processing pipeline, and wherein the primitive depth sorter processing circuitry is configured to:

perform the primitive sub-set depth sorting process on a per tile basis; and depth sort the primitives within a tile on the basis of the depth values the primitives have within the tile in question.

21. The graphics processing pipeline of claim 12, wherein the graphics processing pipeline is a tile-based graphics processing pipeline, and the primitive depth sorter processing circuitry is configured to:

carry out the sub-set depth sorting process during the tiling process before the tile lists are written to memory.

22. A graphics processing pipeline comprising:

rasteriser processing circuitry that rasterises input primitives to generate graphics fragments to be processed, each graphics fragment having one or more sampling points associated with it;

renderer processing circuitry that processes fragments generated by the rasteriser processing circuitry to generate output fragment data; and primitive depth sorter processing circuitry configured to, when the graphics processing pipeline receives a graphics primitive for processing, prior to the rasteriser processing circuitry generating graphics fragments for processing the primitive, add the primitive to a primitive queue, determine the order in which the primitive should exit the queue based on depth values associated with the primitives in the queue, and output primitives from the queue to the rest of the pipeline in the exit order determined based on the depth values associated with the primitives in the queue.

23. A non-transitory computer readable storage medium storing computer software code which when executing on a processor performs a method of operating a graphics processing pipeline that includes rasteriser processing circuitry that rasterises input primitives to generate graphics fragments to be processed, each graphics fragment having one or more sampling points associated with it, and renderer processing circuitry that processes fragments generated by the rasteriser processing circuitry to generate output fragment data, the method comprising:

when the graphics processing pipeline is processing a set of graphics primitives, depth sorting primitives of successive sub-sets of the primitives in the set of graphics primitives prior to the rasteriser processing circuitry generating graphics fragments for processing the primitives;

wherein the step of depth sorting primitives of successive sub-sets of the primitives in the set of graphics primitives prior to the rasteriser processing circuitry generating graphics fragments for processing the primitives comprises: once a sub-set of primitives has been sorted into a sorted sub-set of primitives, passing a primitive in the sorted sub-set of primitives onwards for processing, and adding a next primitive in the set of primitives to the remaining primitives of the sorted sub-set of primitives to generate a new sub-set of primitives for sorting.

* * * * *